(12) United States Patent
Noguchi

(10) Patent No.: US 6,503,307 B1
(45) Date of Patent: Jan. 7, 2003

(54) INK SET, PRINTING METHOD, INK, PRINTED ARTICLE, PRINTING APPARATUS, INK CARTRIDGE, RECORDING UNIT, AND PROCESS OF FORMING POLYMERIC COMPOUND FILMS

(75) Inventor: Hiromichi Noguchi, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/558,513

(22) Filed: Apr. 26, 2000

(30) Foreign Application Priority Data

Apr. 27, 1999 (JP) .......................... 11-119623
Oct. 14, 1999 (JP) .......................... 11-292480

(51) Int. Cl.$^7$ .......................... C09D 11/00; C09D 11/02
(52) U.S. Cl. .......................... 106/31.27; 106/31.43; 106/31.58; 106/31.6; 106/31.75; 106/31.86; 523/161
(58) Field of Search .......................... 106/31.27, 31.43, 106/31.58, 31.6, 31.75, 31.86; 347/100, 98; 523/161

(56) References Cited

U.S. PATENT DOCUMENTS

| | | | |
|---|---|---|---|
| 4,694,302 A | 9/1987 | Hackleman et al. | 347/96 |
| 5,696,182 A | 12/1997 | Kashiwazaki et al. | 523/161 |
| 5,866,638 A | 2/1999 | Shimomura et al. | 523/16 |
| 5,952,401 A | 9/1999 | Kimura et al. | 523/161 |
| 5,952,414 A | 9/1999 | Noguchi et al. | 524/377 |
| 6,056,811 A | 5/2000 | Shimomura et al. | 106/31.36 |
| 6,238,045 B1 * | 5/2001 | Ono et al. | 106/31.13 |
| 6,261,350 B1 * | 7/2001 | Kabalnov | 106/31.33 |
| 6,299,675 B1 * | 10/2001 | Ono et al. | 106/31.27 |

FOREIGN PATENT DOCUMENTS

| | | | |
|---|---|---|---|
| EP | 0 692 527 A2 | 1/1996 | C09D/11/00 |
| JP | 61-23615 | 2/1986 | C08F/220/34 |
| JP | 2510420 B2 | 1/1988 | C09D/11/00 |
| JP | 8-80665 | 3/1996 | B41M/5/00 |
| JP | 10-287035 | 10/1998 | B41M/5/00 |

OTHER PUBLICATIONS

Shin Jikken Kagaku Koza (New Experimental Chemistry Library), "Syntheses and Reactions of Organic Compounds", Maruzen Co., 1978, pp. 1366–1371, no month available.

* cited by examiner

Primary Examiner—Helene Klemanski
(74) Attorney, Agent, or Firm—Fitzpatrick, Cella, Harper & Scinto

(57) ABSTRACT

An ink set is provided which produces a printed article having excellent water resistance and excellent abrasion resistance. The ink set comprises a first liquid composition containing a first water-soluble compound having in the molecule an ethylenically unsaturated double bond having an electron-attractive substituent on the α-position, and a second liquid composition containing a second water-soluble compound having an active hydrogen atom addable to the first compound in coexistence, at least one of the first liquid composition and the second liquid composition further containing a coloring material.

80 Claims, 5 Drawing Sheets

MOVING DIRECTION OF CARRIAGE

INK SET, PRINTING METHOD, INK, PRINTED ARTICLE, PRINTING APPARATUS, INK CARTRIDGE, RECORDING UNIT, AND PROCESS OF FORMING POLYMERIC COMPOUND FILMS

BACKGROUND OF THE INVENTION

1. Field of the Invention

The present invention relates to an ink set, a printing method, an ink, a printed article, a printing apparatus, an ink cartridge, a recording unit, and a process for forming a polymeric compound film.

2. Related Background Art

Printed articles prepared by depositing an ink on a recording medium by ink-jet recording should have the characteristics below:

(1) high water fastness of the color recorded image,
(2) high adhesiveness of the coloring material to the recording medium,
(3) high saturation, high lightness, and high transparency of the recorded dots,
(4) high transparency of light-transmissive recording medium for wider application of the printed articles, and so forth.

Research and developments are being conducted actively for further improvements of the characteristics of the ink-jet printed articles.

In some of the developed methods, two types of liquids reactive with each other are ejected respectively from separate orifices and are allowed to mix and react on the recording medium, thereby improving the water resistance and abrasion resistance of the printed article. For example, Japanese Patent 2510420 discloses a method in which an ink containing carboxymethylcellulose and another ink containing an aluminum salt are allowed to react on a recording medium, and a method in which an ink containing hexamethylenediamine and another ink containing an aliphatic dibasic acid anhydride/chloride are allowed to react on a recording medium.

Japanese Patent Application Laid-Open No. 10-287035 discloses a printing method in which an acrylate monomer in the recording liquid is polymerized by photopolymerization initiator under application of UV ray energy.

The above-mentioned two-liquid ink-jet printing method requires generally a fixation step like light irradiation after application of the liquids onto the recording medium, and the printing apparatus therefor will be large and complicated. Therefore, such a printing method is not suitable for personal uses and other non-industrial application fields.

Generally, the conventional two-liquid ink-jet printing process employs a less water-soluble or water-insoluble substance as the reactive substance, which requires addition of an organic solvent for dissolving the reactive substances to obtain an aqueous solution for ejection by an ink-jet system. However, the added organic solvent may affect the permeability of the liquid into the recording medium to lower the print quality. Accordingly, for further improvement of print quality in ink-jet recording by the two-liquid system, an ink set should be developed which comprises liquids containing a substance highly water-soluble and reactive in water to cause rapid reaction by simple mixing; or containing a substance highly water-soluble and reactive in water to cause rapid reaction by simple mixing, and not adversely affecting a coexisting coloring material.

SUMMARY OF THE INVENTION

The present invention has been accomplished on the above technical background.

An object of the present invention is to provide an ink set which gives a printed article having excellent water resistance and abrasion resistance and deteriorated less by ozone or a like external factor.

Another object of the present invention is to provide a printing method which is capable of giving a high-quality printed article having excellent water resistance and abrasion resistance, and is capable of giving a high-quality printed article stably regardless of the type of the recording medium.

Still another object of the present invention is to provide an ink which is suitable for giving a printed article having excellent water resistance and abrasion resistance and deteriorated less by ozone or a like external factor.

A further object of the present invention is to provide a printed article having excellent water resistance and abrasion resistance and deteriorated less by ozone or a like external factor.

A still further object of the present invention is to provide a printing apparatus, an ink cartridge, and a recording unit for preparing a high-quality printed article having excellent water resistance and abrasion resistance and deteriorated less by ozone or a like external factor.

A still further object of the present invention is to provide an ink set which is capable of forming a polymeric compound film having excellent water resistance and abrasion resistance.

A still further object of the present invention is to provide a method of forming a polymeric compound film having excellent water resistance and abrasion resistance on the surface of a recording medium.

A still further object of the present invention is to provide an aqueous ink useful for forming a dense polymeric compound film having excellent water resistance and abrasion resistance on the surface of a recording medium.

The ink set of an embodiment of the present invention comprises a first liquid composition containing a first water-soluble compound having in the molecule an ethylenically unsaturated double bond having an electron-attractive substituent on the $\alpha$-position, and a second liquid composition containing a second water-soluble compound having an active hydrogen capable of being added to the first compound in coexistence; at least one of the first liquid composition and the second liquid composition further containing a coloring material.

The ink set of another embodiment of the present invention comprises a first liquid composition containing a first water-soluble compound having in the molecule an ethylenically unsaturated double bond having an electron-attractive substituent on the $\alpha$-position, a second liquid composition containing a second water-soluble compound having an active hydrogen capable of being added to the first compound in coexistence, and an ink containing a coloring material.

The printing method of an embodiment of the present invention comprises the steps of (i) providing an ink set comprising a first liquid composition containing a first water-soluble compound having in the molecule an ethylenically unsaturated double bond having an electron-attractive substituent on the the α-position, and a second liquid composition containing a second water-soluble compound having an active hydrogen capable of being added to the first compound in coexistence, at least one of the first liquid composition and the second liquid composition further containing a coloring material; and (ii) applying the first liquid composition and the second liquid composition respectively onto prescribed positions on a recording medium to cause mixing or contact of the first liquid composition and the second liquid composition.

The printing method of another embodiment of the present invention comprises the steps of (i) providing an ink set comprising a first liquid composition containing a first water-soluble compound having in the molecule an ethylenically unsaturated double bond having an electron-attractive substituent on the α-position, a second liquid composition containing a second water-soluble compound having an active hydrogen capable of being added to the first compound in coexistence, and an ink containing a coloring material; (ii) applying the first liquid composition and the second liquid composition respectively onto prescribed positions on a recording medium to cause mixing or contact of the ink with the first liquid composition and the second liquid composition; and (iii) applying the ink onto the recording medium to cause mixing or contact of the first liquid composition and the second liquid composition.

The ink of an embodiment of the present invention contains, in an aqueous medium, at least one compound selected from the group consisting of the compounds represented by Chemical Formulas A-1 to A-12 below, and a coloring material.

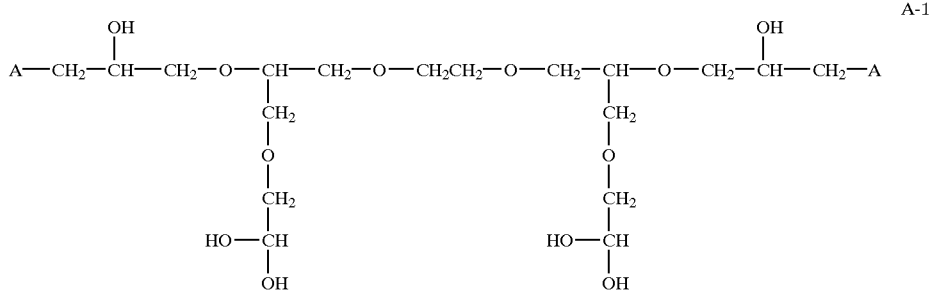

(where A is CH=C(X)—C(=O)—O, and X is H or CH₃)

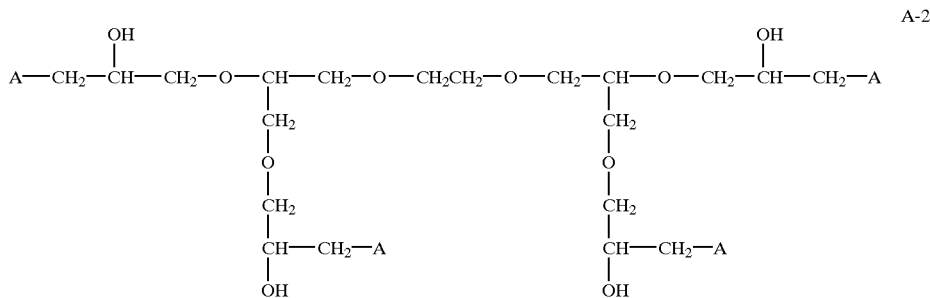

(where A is CH=C(X)—C(=O)—O, and X is H or CH₃)

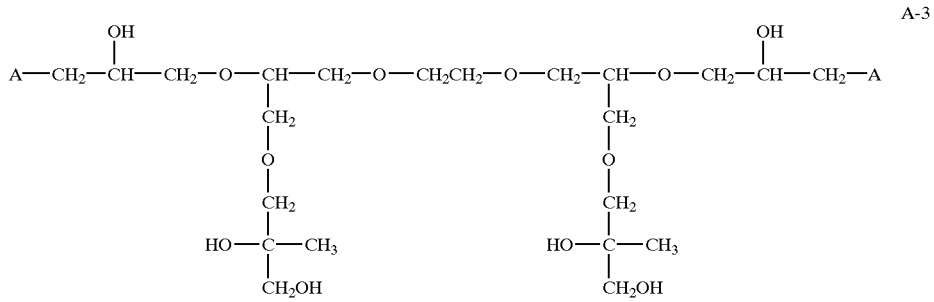

(where A is CH=C(X)—C(=O)—O, and X is H or CH₃)
A-4
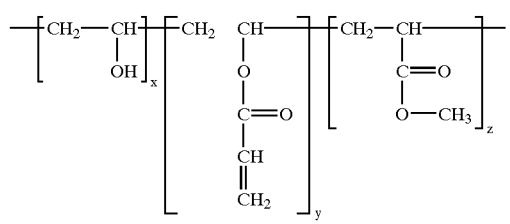
(where x, y and z are respectively an integer in the range of x=10–100, y=3–25, and z=5–25)
A-5
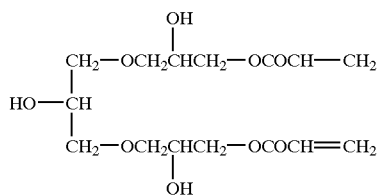
A-6
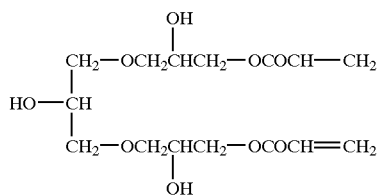
A-7, A-8
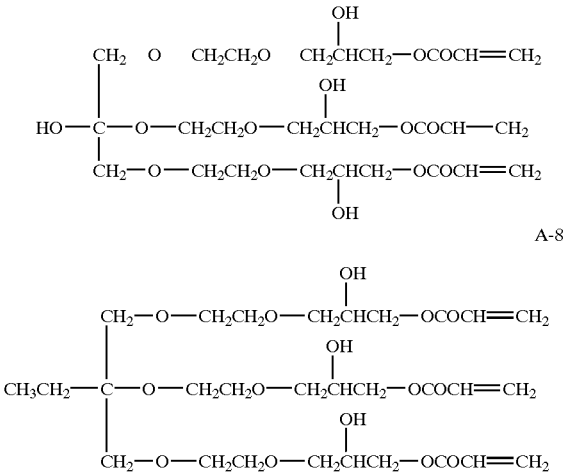
A-9
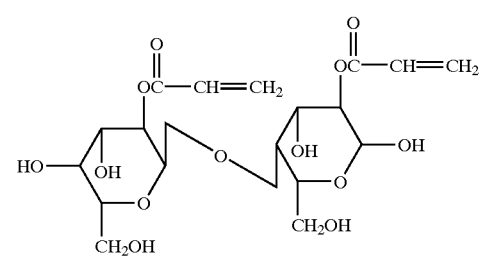
A-10
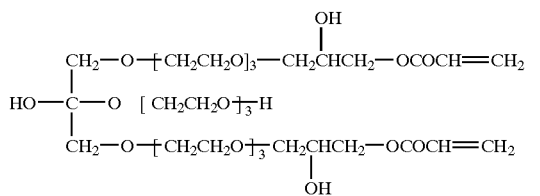
(where x and y are respectively an integer in the range of x=10–25, and y=3–15)
A-11
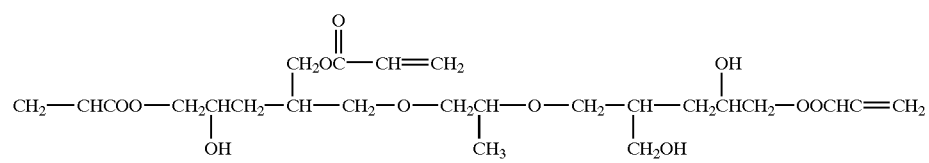
A-12
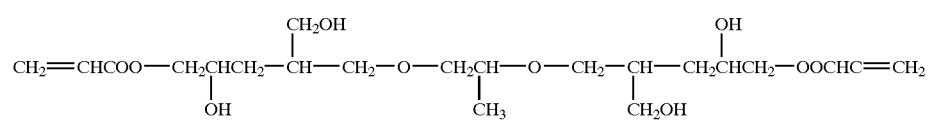

The ink of another embodiment of the present invention contains, in an aqueous medium, at least one compound selected from the group consisting of the compounds represented by Chemical Formulas B-1 to B-17 below, and a coloring material.

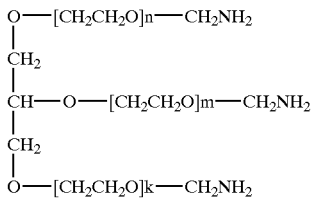   B-1

(where n+m+k is in the range of 0–25)

   B-2

(where n is in the range of 3–25, and $R_1$ is an alkyl of 1–3 carbons)

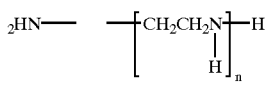   B-3

(where n is in the range of 7–1000)

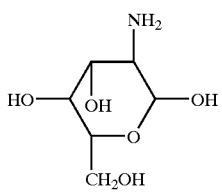   B-4

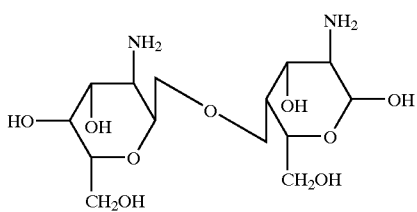   B-5

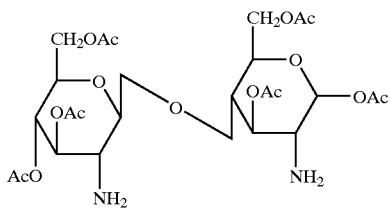   B-6

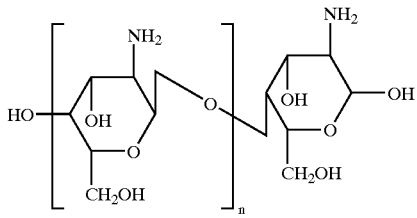   B-7

(where n is in the range of 3–25)

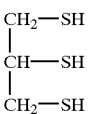   B-8

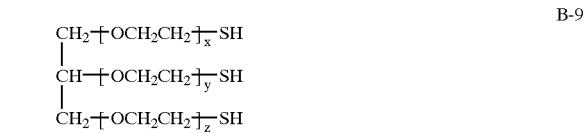   B-9

(where x+y+z is in the range of 1–15)

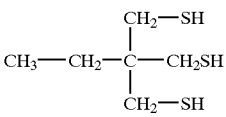   B-10

   B-11
   B-12
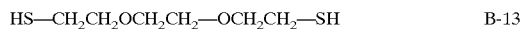   B-13
   B-14

(where n is in the range of 3–16)

   B-15
   B-16
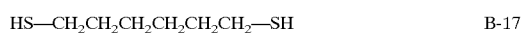   B-17

The ink of still another embodiment of the present invention contains, in an aqueous medium, at least one compound selected from the group consisting of the compounds represented by Chemical Formulas B-1 to B-3 below, and a coloring material.

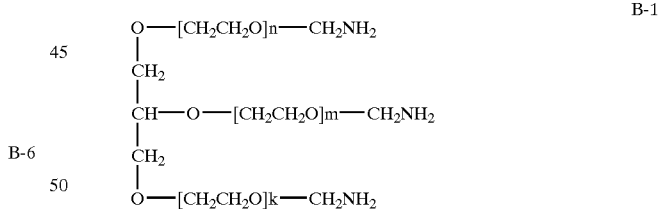   B-1

(where n+m+k is in the range of 0–25)

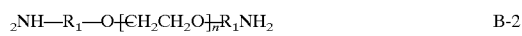   B-2

(where n is in the range of 3–25, and $R_1$ is an alkyl of 1–3 carbons)

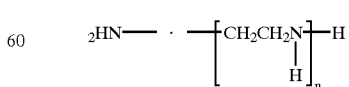   B-3

(where n is in the range of 7–1000)

The printed article of an embodiment of the present invention is a printed article having a colored portion containing a coloring material on a recording medium, the colored portion further containing a reaction product of a first liquid composition and a second liquid composition; the first liquid composition is conatining a first water-soluble compound having in the molecule an ethylenically unsaturated double bond having an electron-attractive substituent on the α-position, and the second liquid composition containing a second water-soluble compound having an active hydrogen atoms addable to the first compound in coexistence.

The printing apparatus of an embodiment of the present invention comprises an ink set comprising a first liquid composition containing a first water-soluble compound having in the molecule an ethylenically unsaturated double bond having an electron-attractive substituent on the α-position, and a second liquid composition containing a second water-soluble compound having an active hydrogen atom addable to the first compound in coexistence, at least one of the first liquid composition and the second liquid composition further containing a coloring material; an ejecting means for ejecting the first liquid composition and the second liquid composition separately onto a recording medium; and a controlling means to bring the first liquid composition and the second liquid composition into contact together in a liquid state on the recording medium.

The printing apparatus of another embodiment of the present invention comprises an ink set comprising a first liquid composition containing a first water-soluble compound having in the molecule an ethylenically unsaturated double bond having an electron-attractive substituent on the α-position, a second liquid composition containing a second water-soluble compound having an active hydrogen atom addable to the first compound in coexistence, and an ink containing a coloring material; an ejecting means for ejecting the first liquid composition, and the second liquid composition, and the ink separately onto a recording medium; and a controlling means to bring the first liquid composition, the second liquid composition, and the ink into contact together in a liquid state on the recording medium.

The ink cartridge of an embodiment of the present invention comprises a first liquid container holding a first liquid composition containing a first water-soluble compound having in the molecule an ethylenically unsaturated double bond having an electron-attractive substituent on the α-position, and a second liquid container holding a second liquid composition containing a second water-soluble compound having an active hydrogen atom addable to the first compound in coexistence; at least one of the first liquid composition and the second liquid composition further containing a coloring material; the ink cartridge being mountable to and demountable from an ink-jet head for ejecting the first liquid composition and the second liquid composition separately.

The ink cartridge of another embodiment of the present invention comprises a first liquid container holding a first liquid composition containing a first water-soluble compound having in the molecule an ethylenically unsaturated double bond having an electron-attractive substituent on the α-position, a second liquid container holding a second liquid composition containing a second water-soluble compound having an active hydrogen atom addable to the first compound in coexistence, and an ink container holding an ink containing a coloring material; the ink cartridge being mountable to and demountable from an ink-jet head for ejecting the first liquid composition, the second liquid composition, and the ink separately.

The recording unit of an embodiment of the present invention comprises a first liquid container holding a first liquid composition containing a first water-soluble compound having in the molecule an ethylenically unsaturated double bond having an electron-attractive substituent on the α-position, a first ink-jet head for ejecting the first liquid composition held in the first liquid container, a second liquid container holding a second liquid composition containing a second water-soluble compound having an active hydrogen atom addable to the first compound in coexistence, and a second ink-jet head for ejecting the second liquid composition held in the second liquid container; at least one of the first liquid composition and the second liquid composition further containing a coloring material.

The recording unit of another embodiment of the present invention comprises a first liquid container holding a first liquid composition containing a first water-soluble compound having in the molecule an ethylenically unsaturated double bond having an electron-attractive substituent on the α-position, a first ink-jet head for ejecting the first liquid composition held in the first liquid container, a second liquid container holding a second liquid composition containing a second compound having an active hydrogen capable of being added to the first compound in coexistence, a second ink-jet head for ejecting the second liquid composition held in the second liquid container, an ink container holding an ink containing a coloring material, and a third ink-jet head for ejecting the ink held in the ink container.

The ink set of a still another embodiment of the present invention comprises a first liquid composition containing a first water-soluble compound having in the molecule an ethylenically unsaturated double bond having an electron-attractive substituent on the α-position, and a second liquid composition containing a second water-soluble compound having an active hydrogen capable of being added to the first compound in coexistence.

The method of forming a polymeric compound film of an embodiment of the present invention comprises the steps of (i) providing an ink set comprising a first liquid composition containing a first water-soluble compound having in the molecule an ethylenically unsaturated double bond having an electron-attractive substituent on the α-position, a second liquid composition containing a second water-soluble compound having an active hydrogen capable of being added to the first compound in coexistence; and (ii) applying the first liquid composition and the second liquid composition respectively onto prescribed positions on a recording medium to cause mixing or contact of the first liquid composition with the second liquid composition to cause reaction of the first compound with the second compound.

The ink of a further embodiment of the present invention contains, in an aqueous medium, at least one compound selected from the group consisting of the compounds represented by Chemical Formulas A-1 to A-12 below.

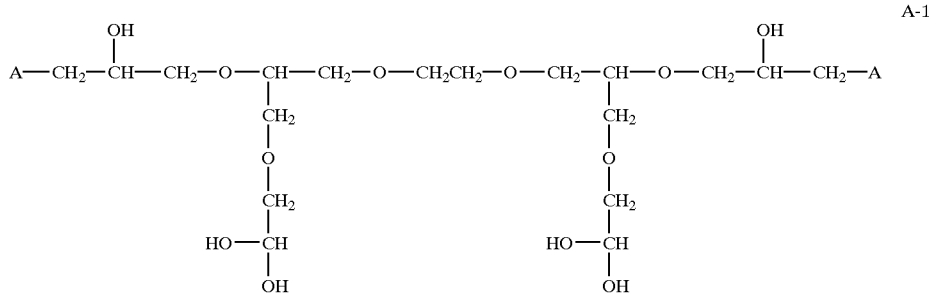
A-1
(where A is CH=C(X)—C(=O)—O, and X is H or CH₃)
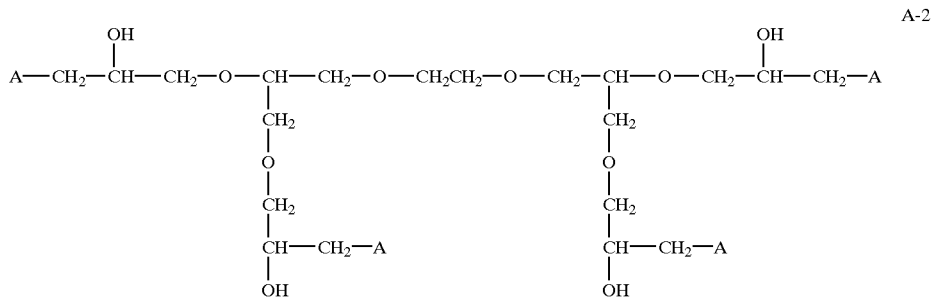
A-2
(where A is CH=C(X)—C(=O)—O, and X is H or CH₃)
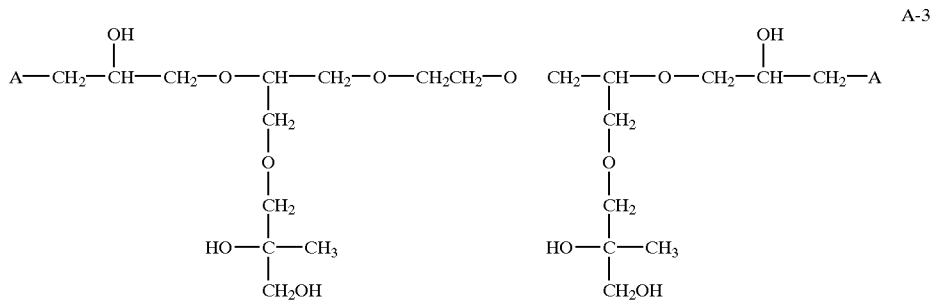
A-3
(where A is CH=C(X)—C(=O)—O, and X is H or CH₃)
(where x, y and z are respectively an integer in the range of x=10–100, y=3–25, and z=5–25)
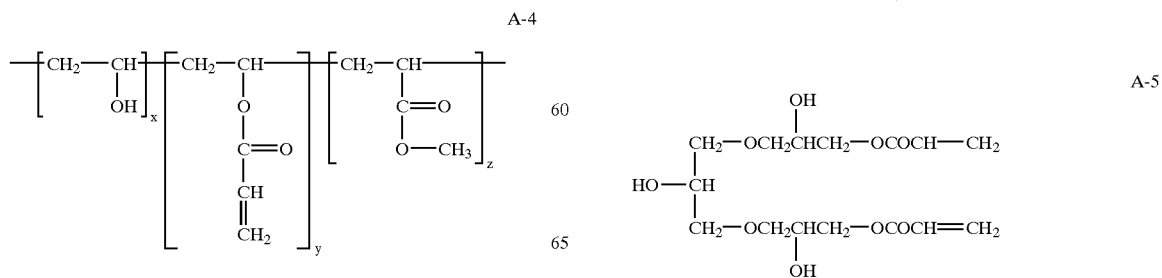
A-4
A-5

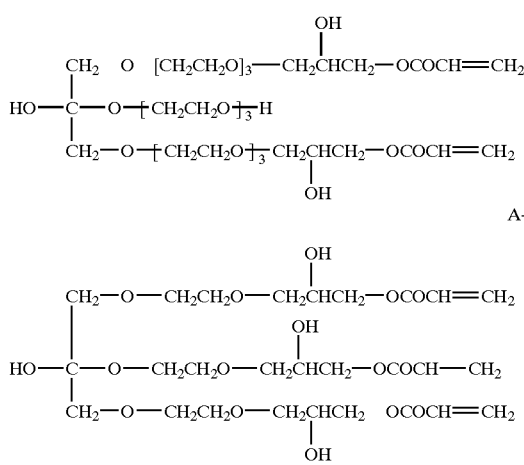
A-6

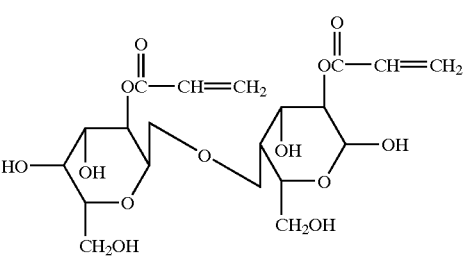
A-7

A-8

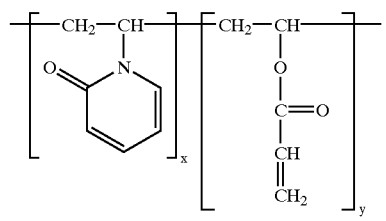
A-9

(where x and y are respectively an integer in the range of x=10–25, and y=3–15)

The ink of a still further embodiment of the present invention contains at least one compound selected from the group consisting of the compounds represented by Chemical Formulas B-1 to B-17 below.

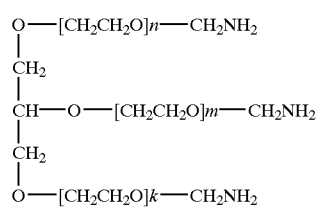
B-1

(where n+m+k is in the range of 0–25)

B-2

(where n is in the range of 3–25, and $R_1$ is an alkyl of 1–3 carbons)

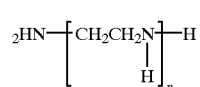
B-3

(where n is in the range of 7–1000)

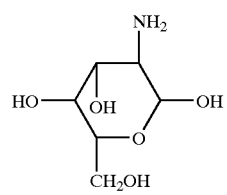
B-4

B-5

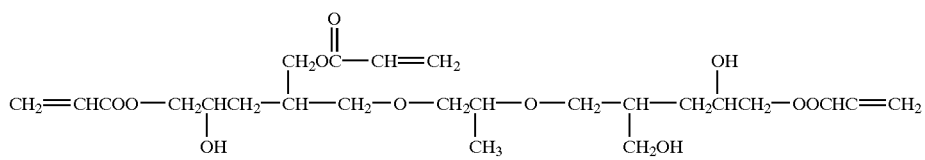
A-11

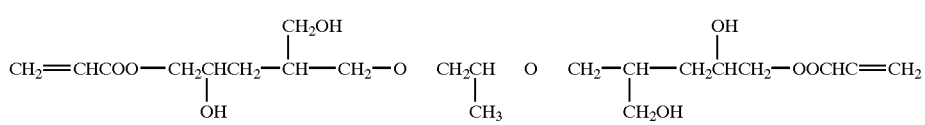
A-12

-continued

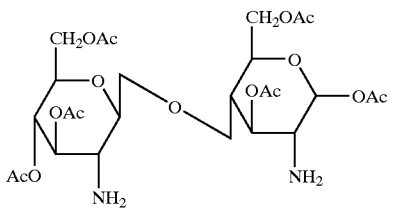

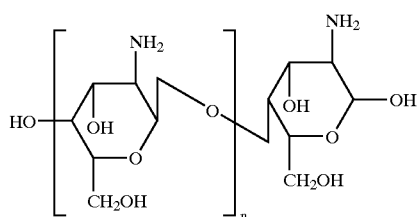

(where n is in the range of 3–25)

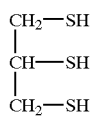

B-8

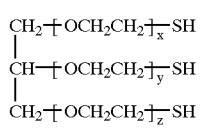

(where x+y+z is in the range of 1–15)

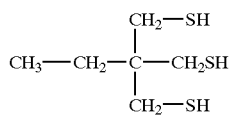

HS—CH$_2$CH$_2$—SH  B-11

HS—CH$_2$CH$_2$OCH$_2$CH$_2$—SH  B-12

HS—CH$_2$CH$_2$OCH$_2$CH$_2$—OCH$_2$CH$_2$—SH  B-13

HS—[CH$_2$CH$_2$O]$_n$—CH$_2$CH$_2$SH  B-14

(where n is in the range of 3–16)

HS—CH$_2$CH$_2$CH$_2$CH$_2$—SH  B-15

HS—CH$_2$CH$_2$CH$_2$CH$_2$CH$_2$—SH  B-16

HS—CH$_2$CH$_2$CH$_2$CH$_2$CH$_2$CH$_2$—SH  B-17

The ink of a still further embodiment of the present invention contains at least one compound selected from the group consisting of the compounds represented by Chemical Formulas B-1 to B-3 below.

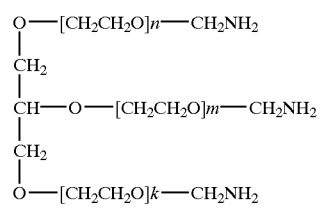

B-1

(where n+m+k is in the range of 0–25)

$_2$HN—R$_1$—O—[CH$_2$CH$_2$O]$_n$—R$_1$—NH$_2$  B-2

(where n is in the range of 3–25, and R$_1$ is an alkyl of 1–3 carbons)

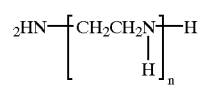

B-3

(where n is in the range of 7–1000)

DESCRIPTION OF THE PREFERRED EMBODIMENTS

Figure 1:
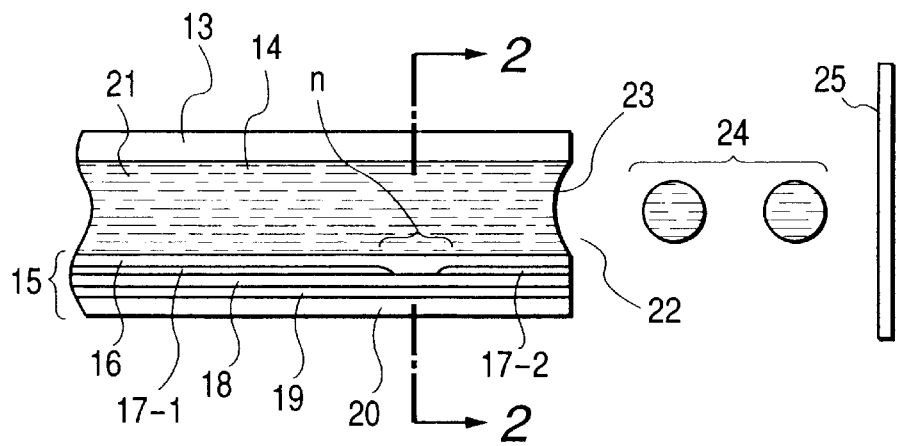
FIG. 1 is a vertical sectional view of a head of an ink-jet recording apparatus.

The ink set of an embodiment of the present invention comprises a first liquid composition containing a first water-soluble compound having in the molecule an ethylenically unsaturated double bond having an electron-attractive substituent on the α-position, and a second liquid composition containing a second water-soluble compound having an active hydrogen capable of being added to the first compound in coexistence; at least one of the first liquid composition and the second liquid composition further containing a coloring material.

In the phrase "having an ethylenically unsaturated double bond having an electron-attractive substituent on the α-position", the term "the α-position" is based on the conventional nomenclature in organic chemistry for identifying the carbon atoms of a carbon-carbon double bond by α and β as shown below.

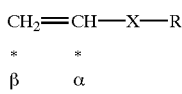

$$\underset{\underset{\beta}{*}}{CH_2}=\underset{\underset{\alpha}{*}}{CH}-X-R$$

As above, of the carbons of the carbon-carbon double bond, the non-terminal carbon atom is named the α-position. The term "electron-attractive" signifies a state of a substituent deficient in electrons and attracting electrons from the adjacent atoms or another molecule. The electron attractive group typically includes groups of nitro, nitrile, carbonyl, carboxyl, and carbonic acid ester. By the electron-attractive group attached to the double bond, the electron density at the α- and β-carbons is decreased in comparison with that without the electron attractive group. Thus, the unsaturated double bond having an electron-attractive group attracts electrons from electron-rich molecules or atom groups to cause an addition reaction. Such a reaction is known as Michael addition reaction. The Michael addition reaction is addition of the hydrogen atom to a carbon-carbon double bond having an electron attractive functional group under relatively mild conditions. The group of nitro, carboxyl, nitrile, or carboxylic ester tends to attract electrons in comparison with hydrogen atom to decrease the electron density in the double bond and to raise the reactivity with an electron-donating substance. For example, the reaction of an unsaturated double bond having a carboxylic ester group proceeds as below:

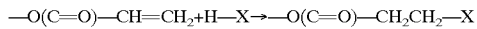

—O(C=O)—CH=CH$_2$+H—X→—O(C=O)—CH$_2$CH$_2$—X

The actual reaction velocity depends on the properties of the compound H—X. This is explained in detail in the published book: Shin Jikken Kagaku Koza (New Experimental Chemistry Library), "Syntheses and Reactions of Organic Compounds" p. 1370 (Maruzen Co., 1978) under the title of "Addition reaction of an amine to a olefin". The compound of H—X includes nucleophilic substances such as amines, aldimines, ketimines, hydroxy-containing compounds, polyenamines, methane tricarboxylic esters, malonic acid, polyesters, acetoacetates, and polyamidoamines.

Such an addition reaction is utilized industrially for curing of paints. For example, Japanese Patent Application Laid-Open No. 61-23615 discloses a curable composition containing (1) a copolymer of an aminoalkyl methacrylate or a copolymer of an aminoalkyl methacrylate and an ethylenic unsaturated monomer, and (2) a compound having at least two acryloyl groups in the molecule. This addition reaction has not been utilized in two-liquid type ink-jet recording. For application of such an addition reaction to the two-liquid ink-jet recording and for higher quality of the printed articles, the reactive components in the respective liquids should be sufficiently water-soluble, and be capable of maintaining the reactivity in the aqueous medium, and the reactive components should cause reaction immediately on mixing on a recording medium to fix the coloring material.

The first water-soluble compound having in the molecule an ethylenic unsaturated double bond having an electron attractive substituent on the α-position includes (1) acrylate esters of a polyol,
(2) acrylate esters of a water-soluble polyepoxide derived from a polyol, and
(3) polymers of a relatively low molecular weight derived by copolymerization of a monomer having a water-soluble functional group on the side chain and another monomer having an unsaturated double bond having an electron attractive group.

The polyol herein signifies generally compounds having two or more hydroxyl groups. The water-soluble functional group includes groups of hydroxyl, carboxyl, sulfo, morpholino, piperidino, pyridyl, and pyrrolidonyl. Such compounds include specifically the compounds represented by Structural Formulas A-1 to A-12 below.

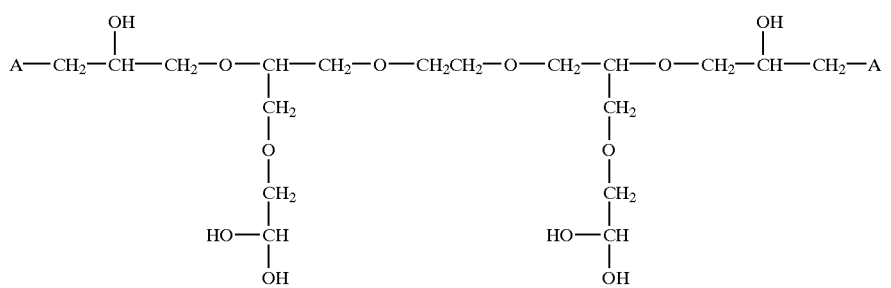

A-1

(where A is CH=C(X)—C(=O)—O, and X is H or CH$_3$)

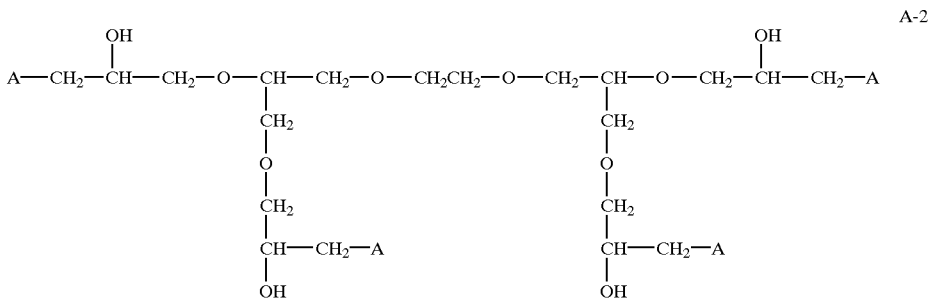

A-2

(where A is CH=C(X)—C(=O)—O, and X is H or CH₃)
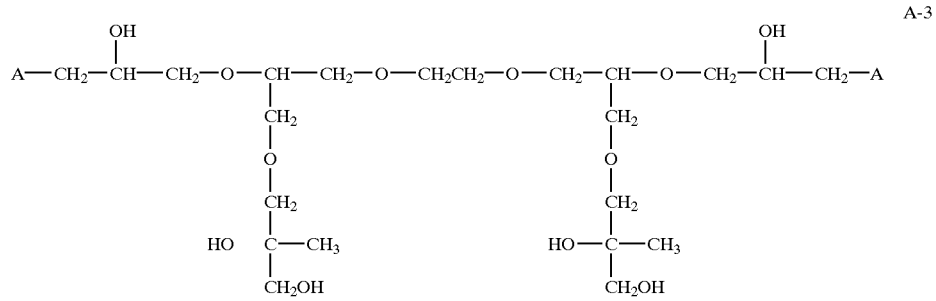
(where A is CH=C(X)—C(=O)—O, and X is H or CH₃)
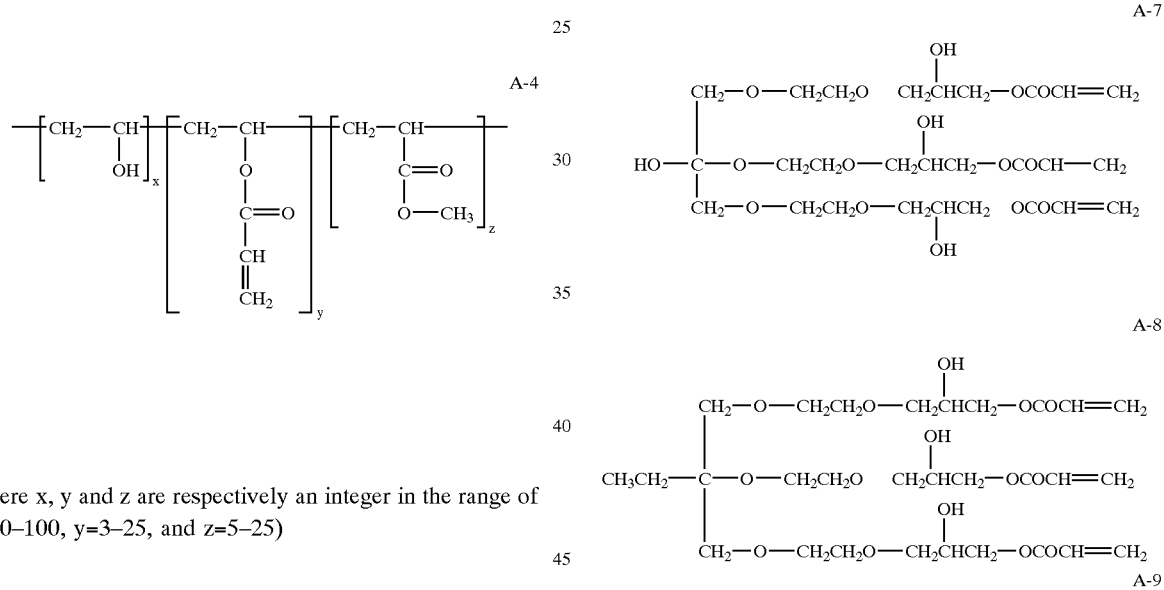
(where x, y and z are respectively an integer in the range of x=10–100, y=3–25, and z=5–25)
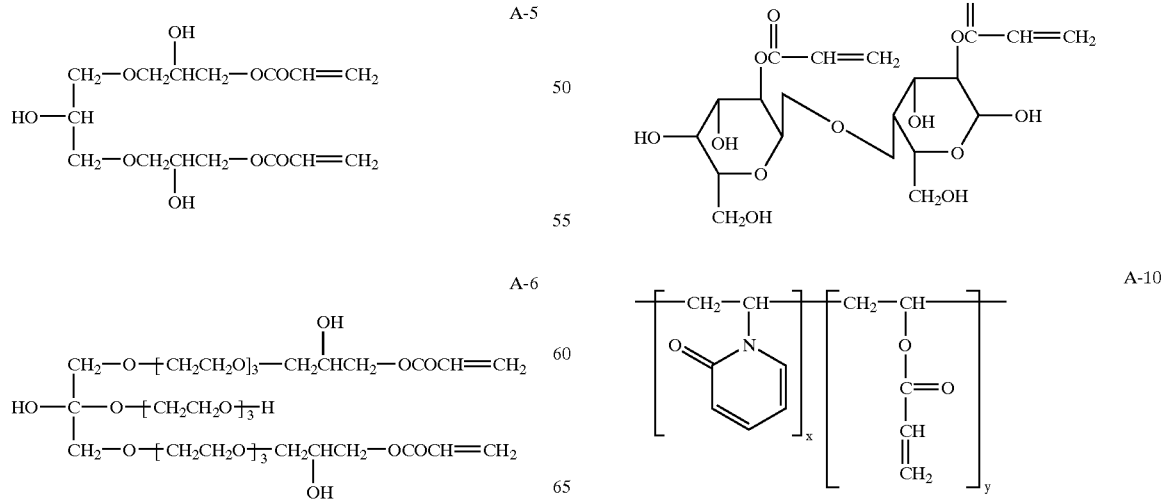

(where x and y are respectively an integer in the, range of x=10–25, and y=3–15)

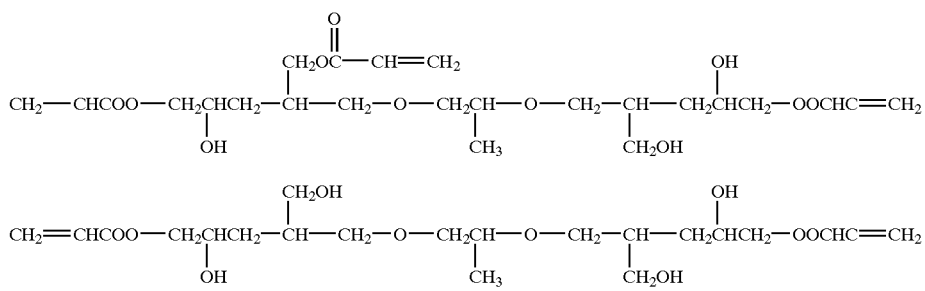

The aforementioned second compound which has active hydrogen and can cause addition reaction with the first compound brought into coexistence are compounds having a primary amino group or a secondary amino group in the molecule, including compounds (a) to (d) shown below.

(a) Amine derivatives of a polyol: polyethylene oxides, and glycerin having a terminal amino group, including the compounds represented by Structural Formulas B-1 and B-2.

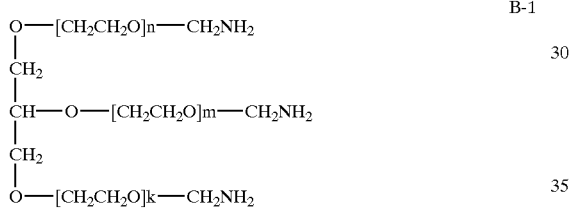

(where n+m+k is in the range of 0–25)

(where n is in the range of 3–25, and $R_1$ is an alkyl of 1–3 carbons)

(b) Polymers of ethylenimine: including the compounds represented by Structural Formula B-3 below.

(where n is in the range of 7–1000)

The commercial products corresponding to the above compounds include Lupasol FG, Lupasol G20 water-free, Lupasol G20, Lupasol G35, Lupasol WF, etc. commercialized by BASF Co.; Epomin SP-006, Epomin SP-012, Epomin SP-018, Epomin SP-200, Epomin PP-061, Epomin PP-1000, etc. commercialized by Nippon Shokubai Kagaku K.K. The above structural formulas show a basic structure. Although some of the above commercial products have a branched structure, they are useful in the practice of the present invention without any inconvenience, provided that they are water-soluble.

(c) Glucosamine, dimer of glucosamine, and amino sugars of 3- to 10-mer of glucosamine: oligomers of sugar structure, for example partial acetrylation, having plural primary amino groups in the molecule. These compound may be modified in the structure, provided that the modified compound is water-soluble. The specific examples are shown by structural formulas B-4 to B7 below.

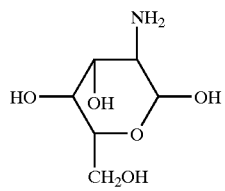

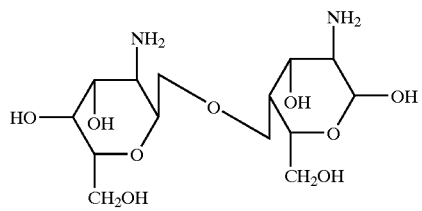

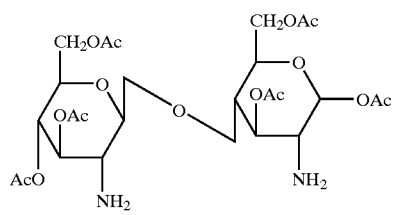

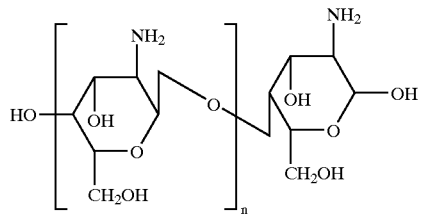

(where n is in the range of 3–25)

(d) Water-soluble polythiol compounds: The examples are shown by Structural Formulas B-8 to B-17

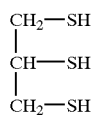

-continued

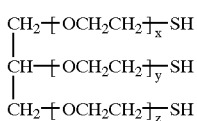      B-9

(where x+y+z is in the range of 1–15)

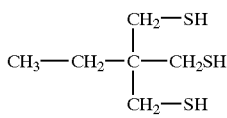      B-10

      B-11

      B-12

      B-13

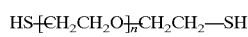      B-14

(where n is in the range of 3–16)

      B-15

      B-16

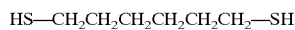      B-17

Table 1 shows the solubilities in water, and the reactivity of Compounds A-1 to A-12, and B-1 to B-17. In Table 1, the water solubility is shown by the highest concentration of the compound for forming a uniform transparent aqueous solution. The reactivity of the compound of Group A is shown by the time for gel formation by the reaction of an aqueous 50% solution of the compound of Group A with a 50% solution of Compound B-1 (trade name: Lupasol FG, supplied by BASF Co.). The reactivity of the compound of Group B is shown by the time for gel formation by the reaction of a 50% solution of the compound of Group B with an aqueous 50% solution of Compound A-1.

The concentrations of the above compounds are preferably in the range from 1% to 30% by weight, more preferably from 5% to 30% by weight in order that the first liquid composition containing at least one of the first compounds and the second liquid composition containing the second compound are brought into contact and mixed to react rapidly to impart sufficient water resistance and abrasion resistance to the printed article. As shown in Table 1, the compounds of A-1 to A-12, and B-1 to B-17 have sufficient water solubility. Therefore, an organic solvent need not be employed for dissolving the first and second compounds in the preparation of the first and second liquid compositions.

The compound of A group and the compound of B group cause an addition reaction with each other. Therefore, by use of a compound having three or more functional groups as one or both of the group-A compound and the Group-B compound, the reaction is allowed to proceed more rapidly on the recording medium to improve adhesiveness of the colored portion onto the recording medium, the water resistance, the abrasion resistance, and the durability.

(Coloring Material)

In an embodiment in which at least one of the first liquid composition and the second liquid composition contains a coloring material, the coloring material should give an intended color on printing by using at least one of the first liquid composition and the second liquid composition. The coloring material may be any of the dyes for ink-jet recording inks. The coloring material includes pigments, anionic dyes, and cationic dyes. The pigments include which is made dispersible stably in an aqueous solvent by action of a water-soluble cationic polymeric compound or a water-soluble anionic polymeric compound, and self-dispersing pigments dispersible in an aqueous solution without addition of a water-soluble ionic polymeric compound. The self-dispersing pigments include ones having a cationic group combined on the surface thereof, and ones having an anionic group combined on the surface thereof. By selecting the coloring material properly, the first liquid composition or the second liquid composition may be made into a black ink or a color ink.

Generally, the second compound is basic. Therefore, in incorporation of the coloring material into the second composition, the coloring material and the second compound are preferably selected in consideration of the compatibility between the coloring material and the second compound.

(Black Pigment)

The black pigment used for preparation of the black ink is explained below.

(Self-Dispersing Cationic Black Pigment)

The self-dispersing cationic black pigment is, for example, a black pigment which has a cationic group bonded to the pigment surface and is dispersible stably in an aqueous medium without a water-soluble ionic polymeric compound or a surfactant. The cationic group includes quaternary ammonium, substituted quaternary ammonium, pyridinium, and phosphonium. The cationic group bonded to the pigment surface may be of one type, or of plural types.

(Self-Dispersing Cationic Carbon Black)

A cationically charged carbon black has on the surface thereof a cationic group selected from the groups shown below.

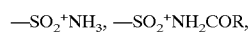

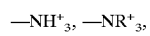

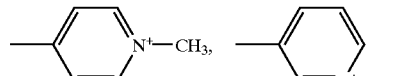

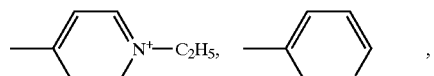

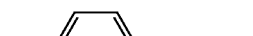

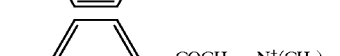

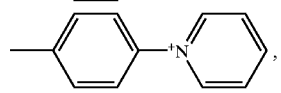

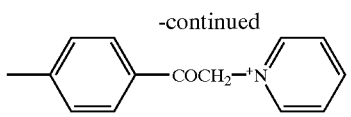

In the above formulas of the cationic group, R represents an alkyl group of 1 to 12 carbons, a substituted or unsubstituted phenyl group, or the like. The above self-dispersing carbon black charged cationically by bonding of a hydrophilic group can be produced, for example, by bonding of an N-ethylpyridyl group of the structure below.

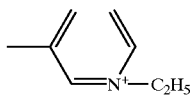

In an example of the production process, carbon black is allowed to react with 3-diazo-N-ethylpyridinium bromide. Otherwise to make the carbon black anionic, carbon black is allowed to react with 4-diazobenzoic acid. The carbon black having been charged to be anionic or cationic by introduction of a hydrophilic group onto the surface of the carbon black particles can disperse stably in an aqueous ink without addition of a dispersant owing to high water dispersibility caused by ionic repulsion.

The hydrophilic group may be bonded directly to the surface of the carbon black. Otherwise, the hydrophilic group may be bonded indirectly with interposition of an atomic group between the surface of the carbon black and the hydrophilic group. The specific examples of the interposed atomic group include linear or branched alkylene groups of 1 to 12 carbons, substituted or unsubstituted phenylene groups, and substituted or unsubstituted naphthylene groups. The substituent on the phenylene group or the naphthylene groups includes linear or branched alkyl group of 1 to 6 carbons.

(Carbon Black+Water-Soluble Cationic Polymeric Compound)

Untreated carbon black also can be dispersed in the ink by addition of a water-soluble cationic polymeric compound as the dispersant into the ink as shown in Japanese Patent Application Laid-Open No. 8-80665. The particulate black pigment dispersed by this method is also suitable for the present invention. The cationic polymeric compound therefor includes copolymers containing a monomer such as N,N-dimethylaminoethyl methacrylate, N,N-dimethylaminoethyl acrylate, N,N-dimethylaminopropyl methacrylate, N,N-dimethylaminopropyl acrylate, N,N-dimethylacrylamide, N,N-dimethylmethacrylamide, N,N-dimethylaminoethylacrylamide, N,N-dimethylethylmathacrylamide, N,N-dimethylaminopropylacrylamide, and N,N-dimethylaminopropylmethacrylamide with the monomer weight ratio ranging from 10% to 50% by weight. The comonomer therefor includes water-soluble monomers such as acrylamides, acrylonitrile, and alkyl acrylates.

The cationic black pigment dispersion, in which the black pigment is dispersed by a cationic polymeric compound, has an average particle diameter ranging preferably from 70 nm to 250 nm.

As mentioned above, the cationic group includes quaternary ammonium, and tertiary amine salts. The counter ion may be an anionic group of an inorganic or organic acid such as acetic acid, lactic acid, hydrochloric acid, sulfuric acid, succinic acid, bromic acid, hydrofluoric acid, or the like. The presence of the counter ions gives stable water-dispersibility in a dissociated state.

The cationic group is added to the black pigment or the water-soluble polymeric compound in an amount to obtain a satisfactory dispersion state in the ink to achieve the intended effect of the present invention.

The black pigment is dispersed in the ink in an amount ranging from 0.5 to 10 parts by weight based on 100 parts by weight of the Ink. The pH of the ink is controlled to be in the range from 2.5 to 8.0. The above mentioned particle diameter and pH are preferred to obtain more stable dispersion state of the dispersion.

(Self-Dispersing Anionic Carbon Black)

A self-dispersing carbon black having an anionic group on the surface can be prepared, for example, by surface modification by bonding covalently an anionic functional group. The anionic functional group is, for example, at least one selected from —COOM, —SO$_3$M, —PO$_3$HM, and PO$_3$M$_2$ (where M represents a hydrogen atom, an alkali metal, an ammonium group, or an organic ammonium group). Of these functional groups, —COOM, and —SO$_3$M are suitable for anionic charging of the carbon black by direct or indirect bonding to the carbon black surface to give excellent dispersibility of the carbon black. The above alkali metal M includes lithium, sodium, and potassium. The above-mentioned organic ammonium includes mono-, di-, and tri-methylammonium; mono-, di-, and tri-ethylammonium; and mono-, di-, and tri-methanolammonium. The anionically charged self-dispersing carbon black can be produced by oxidation treatment of the carbon black with sodium hypochlorite. By this treatment, a —COONa group is introduced by bonding to the carbon black surface.

The aforementioned hydrophilic group may be bonded directly to the carbon black surface. Otherwise the hydrophilic group may be bonded indirectly to the carbon black surface with interposition of another atomic group. This interposed atomic group includes specifically linear or branched alkylene groups of 1 to 12 carbons, substituted or unsubstituted phenylene groups, and substituted or unsubstituted naphthylene groups. The substituent for the phenylene group and the naphthylene group includes linear or branched alkyl groups of 1 to 6 carbons. The specific examples of combination of the interposed atomic group and the hydrophilic group are —C$_2$H$_4$—COOM, —Ph—SO$_3$M, —Ph—COOM, and so forth (Ph represents phenyl).

(Carbon Black+Water-Soluble Anionic Polymeric Compound)

Ordinary carbon black can be used as the coloring material by combination with a water-soluble anionic polymeric compound as a dispersant. The water-soluble anionic polymeric compound therefor includes water-soluble polymeric compounds which are soluble in alkaline water, exemplified by styrene-acrylic acid copolymers, styrene-acrylic acid-alkyl acrylate copolymers, styrene-maleic acid copolymers, and styrene-maleic acid-acrylic acid copolymers.

(Black Dye)

The black coloring material includes not only the aforementioned pigments but also dyes. In consideration of the curing treatment after application onto the recording medium of the present invention by UV irradiation, the dye is selected preferably from those having sufficient light fastness. The preferred black anionic dye includes monoazo complexes and disazo complexes having a coordinating polyvalent metal such as Cr, Cu, Mn, Al, Zn, and Fe; and non-complex type azo black dyes such as C.I. Direct Black 17, C.I Direct Black 19, C.I. Direct Black 51, C.I. Direct Black 154, C.I. Direct Black 174, and C.I. Direct Black 195.

Black cationic dyes are also useful as the coloring material. The black cationic dyes include Aizen Cationic Black SBH, Aizen Cationic Black BXH, Aizen Cationic Black SH, Aizen Cationic Black ACH, Aizen Cationic Black MH, and Aizen Cationic Black TH produced by Hodogaya Chemical Co.; Sumiacryl Black B, Sumiacryl Black R, Sumiacryl Black AP, Sumiacryl Black BP, Sumiacryl Black CP, and Sumiacryl Black PPP produced by Sumitomo Chemical Co.; and Diacryl Supra Black GSL, Diacryl Black RSL, and Diacryl Supra Black ESL produced by Mitsubishi Chemical Co.

(Color Ink)

(Pigment)

The organic pigments having a hue of a process color for the color ink include:

(1) yellow pigments such as Pigment Yellow 1, 2, 3, and 12, Pigment Yellow 13, Pigment Yellow 14, Pigment Yellow 16, Pigment Yellow 17, Pigment Yellow 55, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 109, Pigment Yellow 110, Pigment Yellow 114, Pigment Yellow 128, Pigment Yellow 138, Pigment Yellow 139, Pigment Yellow 150, Pigment Yellow 154, and Pigment Yellow 180, (2) magenta pigments such as Pigment Red 5, Pigment Red 7, Pigment Red 12, Pigment Red 48(Ca), Pigment Red 48(Mn), Pigment Red 57:1, Pigment Red 57(Sr), Pigment Red 57:2, Pigment Red 122, Pigment Red 123, Pigment Red 168, Pigment Red 184, and Pigment Red 202; and (3) cyan pigments such as Pigment Blue 1, Pigment Blue 2, Pigment Blue 3, Pigment Blue 16, Pigment Blue 22, Pigment Blue 60, Pigment Blue 15:2, Pigment Blue 15:3, Vat Blue 4, and Vat Blue 60.

(Color Dye)

(Anionic Color Dye)

Dyes are generally inferior in light fastness to pigments. However, the dye can be made practically useful by selecting the wavelength and intensity of the light for curing to minimize the discoloration of the dye in many cases. The applicable dyes can be selected depending on the uses. The useful anionic dyes for respective colors include:

(1) yellow dyes such as Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 86, Direct Yellow 132, Direct Yellow 142,

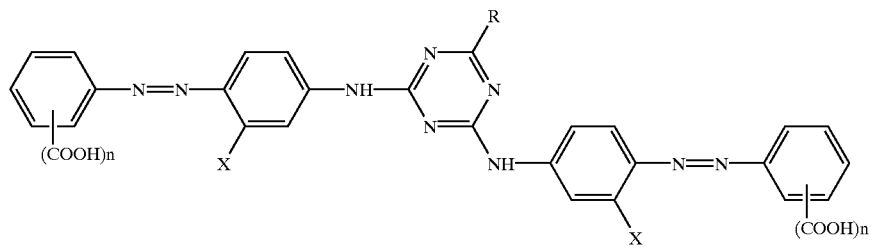

(where R is —H or —CH$_3$, X is —H, —OH or —CH$_3$ and n is an integer of 1 or 2), and

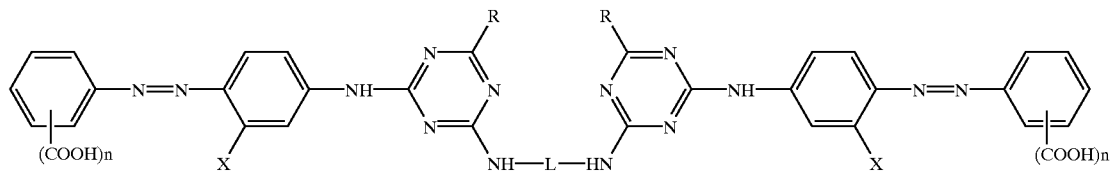

(where R is —H or —CH$_3$, X is —H, —OH or —CH$_3$, L is

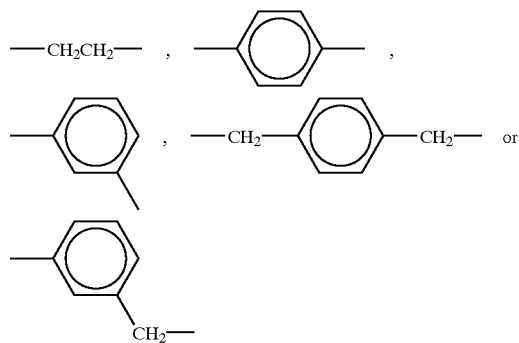

and n is an integer of 1 or 2);

(2) magenta red dyes such as Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 256, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, Direct Red 243,

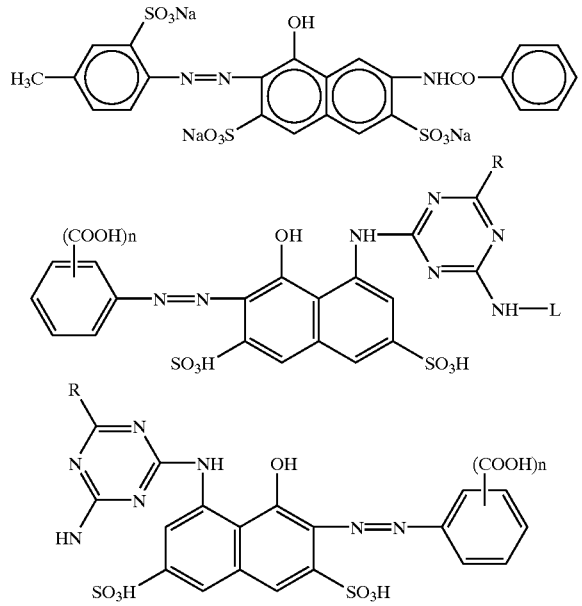

(where R is —H, —OH, or —CH$_3$, L is

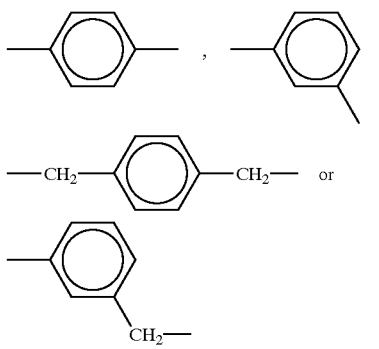

and n is an integer of 1 or 2),

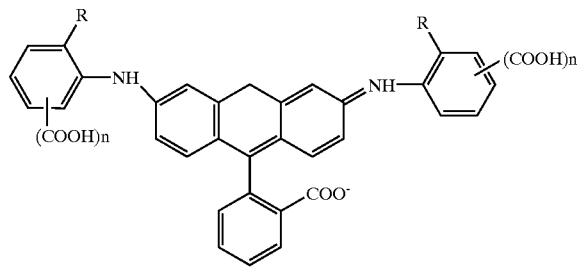

(where R is —OH or —CH$_3$, and n is an integer of 1 or 2); and (3) cyan dyes such as Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, Direct Blue 199,

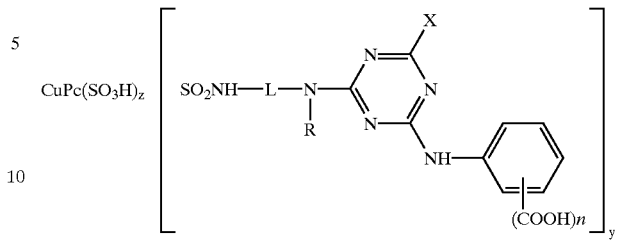

(where X is —H, —NH$_2$, or —CH$_3$; R is —H or —CH$_3$; L is

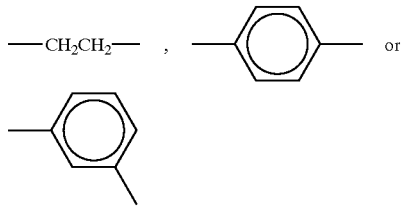

n is an integer of 1 or 2; and x+y is 3 or 4; and CuPc represents a copper phthalocyanine skeleton),

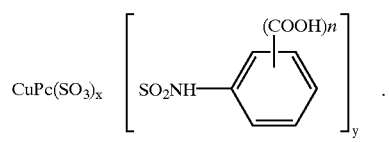

(where x+y is 3 or 4).

The anionic color dye is not limited to the above. Any compound newly developed can be applied without difficulty to the present invention provided that the that the hue, the light resistance, and solubility are suitable.

(Cationic Color Dye)

Cationic dyes, which have a bright hue and are excellent in dyeing power, are generally inferior in light resistance to pigments. However, the dye can be made practically useful by selecting the wavelength and irradiation time of the light for curing. Usual cationic dyes have a structural skeleton of cyanine, azo, azomethine, xanthene, triphenylmethane, methine, polymethine, phthalocyanine, or the like. The cationic color dyes include C.I. Basic Yellow 1, C.I. Basic Yellow 11, C.I. Basic Yellow 13, C.I. Basic Yellow 19, C.I. Basic Yellow 21, C.I. Basic Yellow 25, C.I. Basic Yellow 33, C.I. Basic Yellow 36, C.I. Basic Red 1, C.I. Basic Red 2, C.I. Basic Red 9, C.I. Basic Red 12, C.I. Basic Red 13, C.I. Basic Red 38, C.I. Basic Red 39, C.I. Basic Red 92, C.I. Basic Blue 1, C.I. Basic Blue 3, C.I. Basic Blue 5, C.I. Basic Blue 9, C.I. Basic Blue 19, C.I. Basic Blue 24, C.I. Basic Blue 25, C.I. Basic Blue 26, C.I. Basic Blue 28, C.I. Basic Blue 45, C.I. Basic Blue 54, and C.I. Basic Blue 65. These dyes may be used in combination for preparation of a black ink.

(Solvent)

The first compound and the second compound, which are highly soluble in water and are nonvolatile, serves respectively as a drying inhibitor in a liquid composition state before the reaction. Therefore, the organic solvent conventionally employed in ink-jet recording or other applications is not necessary, but may be used for wetting of the recording medium, control of the ink dot shape, improvement of ink penetration and ink fixation, and other purposes.

As for the solvent for the aqueous black or color ink, an aqueous solvent is used. The aqueous solvent may be a mixture of water and a water-soluble organic solvent. The aqueous organic solvent includes ethylene glycol, diethylene glycol, triethylene glycol, tripropylene glycol, glycerin, 1,2,4-butanetriol, 1,2,6-hexanetriol, 1,2,5-pentanetriol, 1,2-butanediol, 1,3-butanediol, 1,4-butanediol, dimetylsulfoxide, diacetone alcohol, glycerin monoallyl ether, propylene glycol, butylene glycol, polyethylene glycol 300, thiodiglycol, N-methyl-2-pyrrolidone, 2-pyrrolidone, γ-butyrolactone, 1,3-dimethyl-2-imidazolidinone, sulfolane, trimethylolpropane, trimethyloethane, neopentylglycol, ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether, dipropylene glycol monomethyl ether, β-dihydroxyethyl urea, urea, acetonylacetone, pentaerythritol, and 1,4-cyclohexanediol. The solvent may be used in combination of two or more thereof.

The aqueous solvent further includes hexylene glycol, ethylene glycol monopropyl ether, ethylene glycol monobutyl ether, ethylene glycol monoisobutyl ether, ethylene glycol monophenyl ether, diethylene glycol diethyl ether, diethylene glycol monobutyl ether, diethylene glycol monoisobutyl ether, triethylene glycol monobutyl ether, triethylene glycol dimethyl ether, triethylene glycol diethyl ether, tetraethylene glycol dimethyl ether, tetraethylene glycol diethyl ether, propylene glycol monobutyl ether, dipropylene glycol monomethyl ether, dipropylene glycol monopropyl ether, dipropylene glycol monobutyl ether, tripropylene glycol monomethyl ether, glycerin monoacetate, glycerin diacetate, glycerin triacetate, ethylene glycol monomethyl ether acetate, diethylene glycol monomethyl ether acetate, cyclohexanol, 1,2-cyclohexanediol, 1-butanol, 3-methyl-1,5-pentanediol, 3-hexane-2,5-diol, 2,3-butanediol, 1,5-pentanediol, 2,4-pentanediol, and 2,5-hexanediol.

A primary alcohol such as ethanol, n-propanol, 2-propanol, 1-methoxy-2-propanol, furfuryl alcohol, and tetrahydrofufuryl alcohol may be used for controlling the penetration and wetting of the ink.

The aqueous solvent is used usually in an amount ranging from 5% to 40% by weight based on the entire ink.

(Concentration of Coloring Material in Liquid)

In the case where the coloring material, a dye or a pigment, is contained in at least one of the first liquid composition and the second liquid composition, the dye as the coloring material is contained at a concentration ranging preferably from 0.5% to 7.0% by weight in the liquid; and the pigment as the coloring material is contained at a concentration ranging preferably from 0.5% to 10% by weight in the liquid. In recent years, a light color ink having a lower concentration is used sometimes for higher reproducibility of halftone. In such a case, the concentration of the dye or pigment as the coloring material may be lowered to about 0.1% by weight.

(Liquid Properties)

The first and second liquid compositions are used suitably for recording by ejection of liquid droplets by action of mechanical energy to the ink, recording by ejection of liquid droplets by bubbling of the ink by application of thermal energy to the ink, or other type of recording. The ink for such ink-jet recording has preferably the properties for precise ink ejection from an ink-jet head. The properties of the ink is preferably adjusted to give suitable size of dot shape on application of the ink onto a recording medium for high-quality image formation. In view of the ejection from the ink-jet head and the behavior of the ink immediately after the application onto a recording medium, the liquid preferably has a viscosity ranging from 1 to 15 cP, and a surface tension not lower than 25 dyn/cm, more preferably a viscosity ranging from 1 to 5 cP, and a surface tension ranging from 25 to 50 dyn/cm.

(Ink Set)

The ink set of an embodiment of the present invention is exemplified by the combinations of the first liquid composition and the second liquid composition as shown in Table 2.

Of the ink sets shown in Table 2, Ink Sets 1–3 are useful for forming black print on a recording medium. By use of such an ink set, by applying the first liquid composition and the second liquid composition onto a recording medium so as to mix with each other, penetration of the coloring material or materials contained in one or both of the first and second liquid compositions into the recording medium is inhibited by the reaction product of the first and second compounds contained in the liquids. Consequently, a printed article can be obtained with high black color density with less or little feathering. Further, the fixation of the coloring material on the recording medium is improved to result in excellent water resistance and excellent abrasion resistance of the print.

In Ink Sets 4–8, each of the first liquid composition and the second liquid composition contains a black color material or another color material. When the first liquid composition and the second liquid composition of the ink set are applied to be in contact adjacently with each other, the first compound and the second compound cause reaction at the boundary between the black print area and the color print area. Therefore, less or little bleeding arises at the boundary region. In Ink Sets 4–8, the color ink containing a coloring material in the first liquid composition and/or the second liquid composition is, for example, at least one ink selected from a cyan ink, a magenta ink, and a yellow ink. The ink set having all of the cyan ink, the magenta ink, and the yellow ink enables multicolor printing of extremely high quality. When the first liquid composition and the second liquid composition contain respectively an ink of the same color tone and the inks have the same or nearly the same color tone, bleeding is suppressed or inhibited between the printed area of that color and the adjacent printed area of another color on a recording medium. When the first liquid composition and the second liquid composition contain respectively a coloring material different in color tone to obtain different color inks, bleeding is suppressed or inhibited between the printed areas of different colors on a recording medium.

Ink Set 9 is constituted of the first liquid composition, the second liquid composition, and an ink containing a coloring material. The ink may be a black ink, a color ink, or a combination of a black ink and a color ink. When the ink is a black ink or a color ink, the first liquid composition, the second liquid composition, and the ink are applied by use of this ink set so as to mix together on a recording medium to obtain a printed article with a high optical density, less feathering, excellent water resistance, and excellent abrasion resistance.

In the case where the ink is constituted of inks of a black ink and a color ink, when the first liquid composition and the black ink are applied so as to mix together on a recording medium, and the second liquid composition and the color ink are applied so as to mix together on the recording medium and to be adjacent to the above black ink print area, the bleeding at the boundary region between the black print area and the color print area is effectively inhibited to obtain a high-quality color printed article. Otherwise, with the same ink set, when the second liquid composition and the black ink are applied so as to mix together on a recording medium, and the first liquid composition and the color ink are applied so as to mix together on the recording medium and to be adjacent to the above black ink print area, the bleeding at the boundary region between the black print area and the color print area is effectively inhibited to obtain a high-quality color printed article.

In the case where neither the first liquid composition nor the second ink composition contains an ink, both the first and second compounds can be added in an amount up to about 50% by weight of the ink owing to synergism of the water solubilities of both the compounds.

In preparation of an ink ejectable in ink-jet recording, the water-soluble polymeric compound is added at a concentration of less than about 10% by weight owing to the limitation of the ink viscosity.

The above ink set enables remarkable improvement of abrasion resistance of printed articles. The combination of the first liquid composition and the second composition of Ink Set 9 without the ink containing a coloring material (hereinafter the combination is referred to as Ink Set 10) can form a remarkably high-solid polymeric compound film on a recording medium. The formed polymeric film has a high solid content, and a large layer thickness. Such a film is useful practically as a coating layer and as a print having rising portions by itself, and is useful for protection of the ink-jet recorded matters, and as a protection layer, or top coating, of printed articles. With this polymeric compound film, the ink-jet recorded articles are improved further in glossiness, reflection density, prevention of staining, dirt removability, water resistance, light fastness, ozone resistance, and so forth. Such a protection film is useful for the local protection of limited necessary portions. Ink Set 10 giving the aforementioned effects is included in the scope of the present invention.

(Ink-Jet Recording Apparatus)

Figure 2:
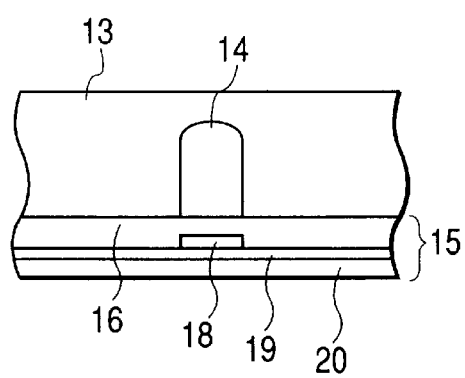
FIG. 2 is a sectional view of the head taken along line 2—2 in FIG. 1.

FIG. 1 is a sectional view of a head 13 along an ink flow path. FIG. 2 is a sectional view of the head taken along line 2—2 in FIG. 1. The head 13 is constructed by bonding a plate of glass, ceramics, silicon, plastics, or the like having a flow path (nozzle) 14 for ink flow with a heater element substrate 15 for thermal recording. The heater element substrate 15 is constituted of a protection layer 16 formed from silicon oxide, silicon nitride, silicon carbide, or the like; electrodes 17-1, 17-2 formed from aluminum, gold, aluminum-copper alloy, or the like; a heating resistor layer 18 formed from a high melting material such as $HfB_2$, TaN, and TaAl; a heat-accumulating layer 19 formed from thermally oxidized silicon, aluminum oxide, or the like; and a substrate 20 made of a heat-radiating material such as silicon, aluminum, and aluminum nitride.

On application of an electric signal information to the electrodes 17-1, 17-2 of the head, the region denoted by a symbol "n" on the heater element substrate head 15 generates heat abruptly to form bubbles in the ink on the surface of the heater element substrate, the pressure of the bubbles pushes out the meniscus 23 to eject the ink 21 through the nozzle 14 and the orifice 22 in a shape of droplets 24. The ejected ink droplets travel toward a recording sheet 25.

Figure 3:
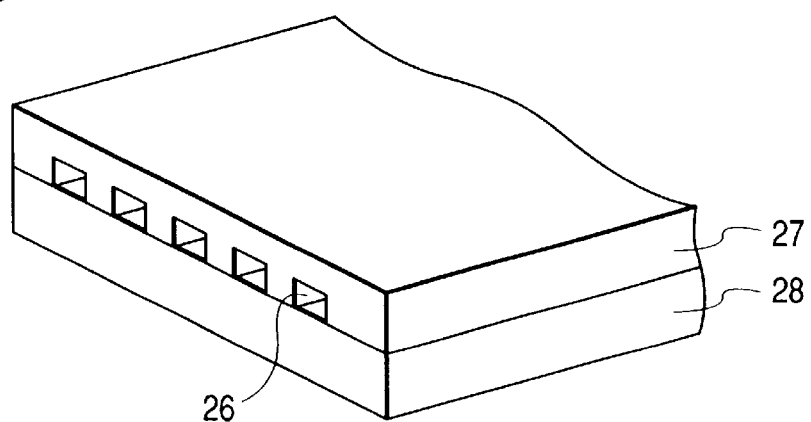
FIG. 3 is a perspective external view of a head which has a multiple of the head shown in FIG. 1.

FIG. 3 shows a external appearance of a multiple head having juxtaposed plural heads shown in FIG. 1. The multiple head is formed by bonding a glass plate 27 having multiple nozzles 26 with a heat-generating head 28 like the one shown in FIG. 1.

Figure 4:
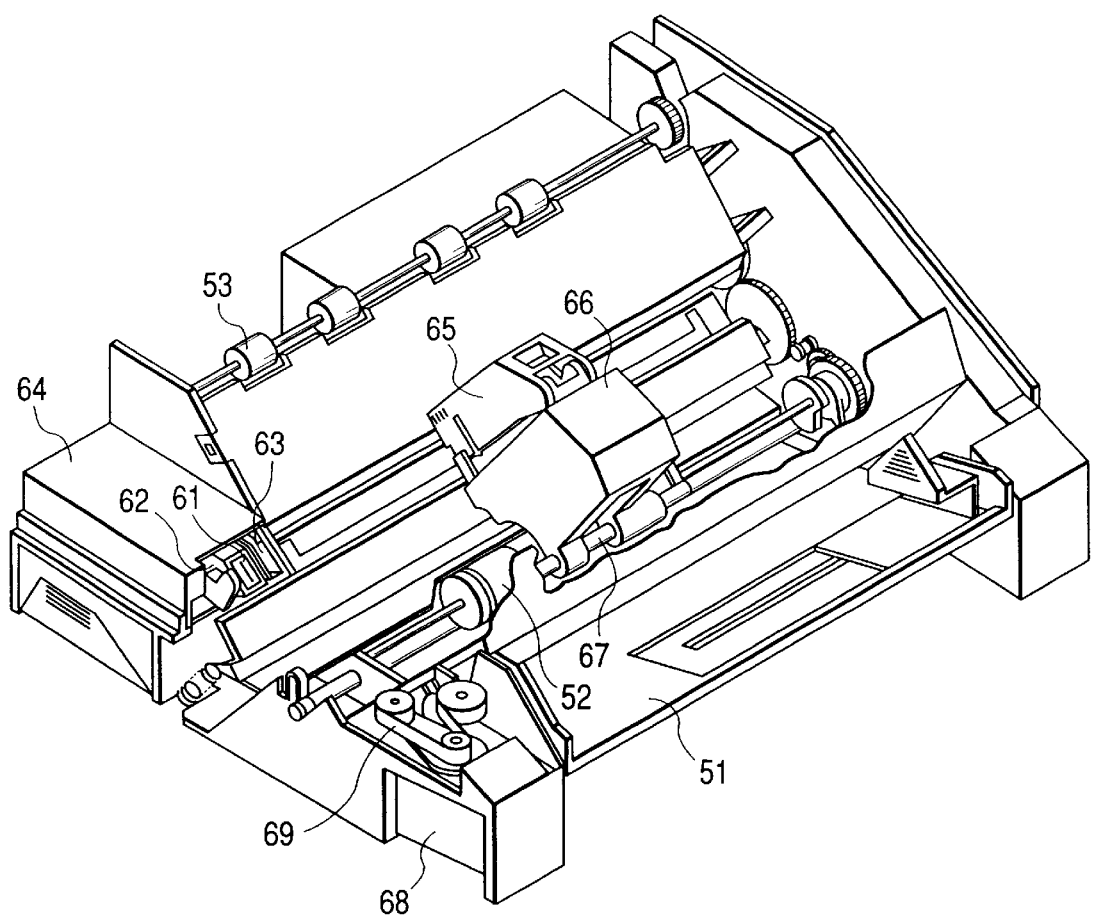
FIG. 4 is a schematic perspective view of an ink-jet recording apparatus.

FIG. 4 shows an example of the ink-jet recording apparatus equipped with the above-described head. In FIG. 4, a blade 61 as a wiping member is held at one end of the blade with a blade-holding member, forming a fixed end in a shape of a cantilever. The blade 61 is placed at a position adjacent to the recording region of the recording head, and, in this example, is held so as to protrude into the moving path of the recording head.

A cap 62 for the ejection nozzle face of a recording head 65 is placed at a home position adjacent to the blade 61, and is constituted such that it moves in the direction perpendicular to the moving direction of the recording head to come into contact with the ejection nozzle face to cap the nozzle. An ink absorbent 63 is placed at a position adjacent to the blade 61, and is held so as to protrude into the moving path of the recording head 65 in a manner similar to that of the blade 61. The blade 61, the cap 62, and the ink absorbent 63 constitute an ejection recovery device 64. The blade 61, and the ink absorbent 63 serve to remove off water, dust, and the like from the face of the ink ejection nozzle.

A recording head 65 has an energy-generating means for the ejection, and conducts recording by ejecting the ink onto a recording medium opposing to the ejection nozzle face. A carriage 66 is provided for supporting and moving the recording head 65. The carriage 66 is engaged slidably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto. A paper sheet delivery device 51 for delivery of a recording medium and a paper sheet delivery roller 52 driven by a motor (not shown in the drawing) delivers a recording medium to the position opposing to the ejection nozzle face of the recording head.

With the above constitution, the recording medium is delivered with the progress of the recording, and is delivered further to a paper discharge device provided with paper sheet-discharging rollers 53. In the above constitution, when the recording head 65 returns to the home position on completion of recording, the cap 62 of the ejection-recovery device 64 is positioned out of the moving path of the recording head 65, and the blade 61 is allowed to protrude to the moving path. Thereby, the ejecting nozzle face of the recording head 65 is wiped. To cap the ejection face of the recording head 65, the cap 62 protrudes toward the moving path of the recording head to come into contact with the ejection nozzle face. When the recording head 65 is made to move from the home position to the record-starting position, the cap 62 and the blade 61 are at the same position as in the above-mentioned wiping step, so that the ejection nozzle face of the recording head 65 is wiped also in this movement.

The recording head is moved to the home position not only at the completion of the recording and at the time of ejection recovery, but is also moved at a predetermined intervals during recording from the recording region. The nozzle is wiped by this movement.

(Ink Cartridge)

Figure 5:
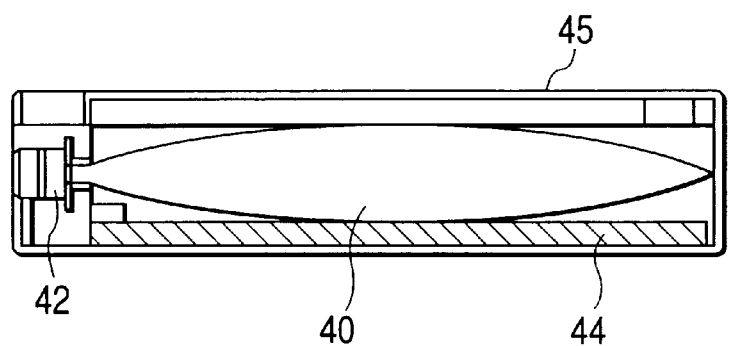
FIG. 5 is a vertical sectional view of an ink cartridge.

FIG. 5 is a sectional view of an example of an ink cartridge 45 which holds an ink to be supplied through an ink supplying member such as a tube. An ink container 40, for example, an ink bag, contains an ink to be supplied, and has a rubber plug 42 at the tip. Insertion of a needle (not shown in the drawing) into the plug 42 enables supply of the ink from the ink bag 40 to the head. A waste-ink absorbent 44 serves to absorb a waste ink. The liquid-contacting face of the ink container is preferably formed from polyolefin, especially polyethylene, in the present invention.

(Recording Unit)

Figure 6:
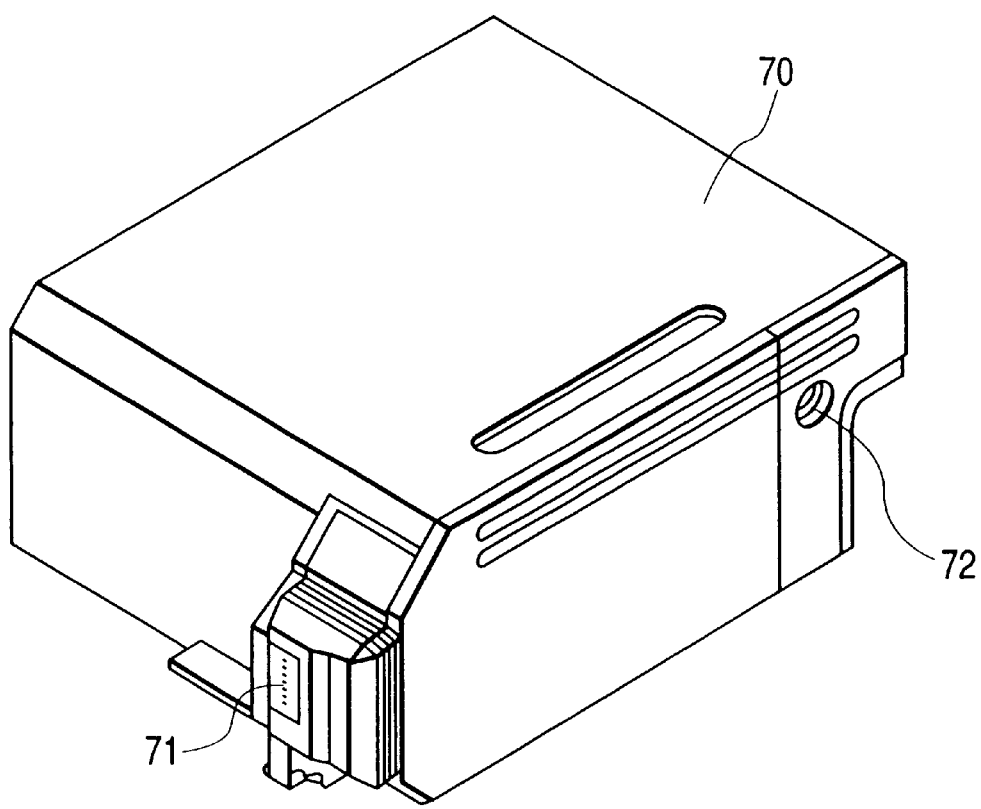
FIG. 6 is a perspective view of a recording unit.

The ink-jet recording apparatus used in the present invention is not limited to the above-mentioned one which has separately a head and an ink cartridge. Integration thereof as shown in FIG. 6 may suitably be employed. In FIG. 6, a recording unit 70 houses an ink holding member such as an ink absorbent, and the ink in the absorbent is ejected from a plurality of orifices of a head 71. The ink absorbent is made preferably of polyurethane in the present invention.

The ink-holding member may be a structure of an ink bag having a spring inside without employing the ink absorbent. An air-communication opening 72 is provided for communication of the cartridge interior with the open air. The recording unit 70 may be used in place of the recording head 65 shown in FIG. 4, and is made to be mountable to and demountable from the carriage 66.

In another example of the ink-jet recording apparatus which utilizes a dynamic energy, an on-demand ink-jet recording head is employed. The on-demand ink-jet recording head comprises a nozzle-holding substrate having plural nozzles, and a pressure-generating element constituted of a piezo-electric material opposing to the nozzles and an electroconductive material, and is filled with an ink around the pressure-generating element. By application of a voltage, the pressure-generating element is displaced to eject the ink droplets through the nozzles.

Figure 7:
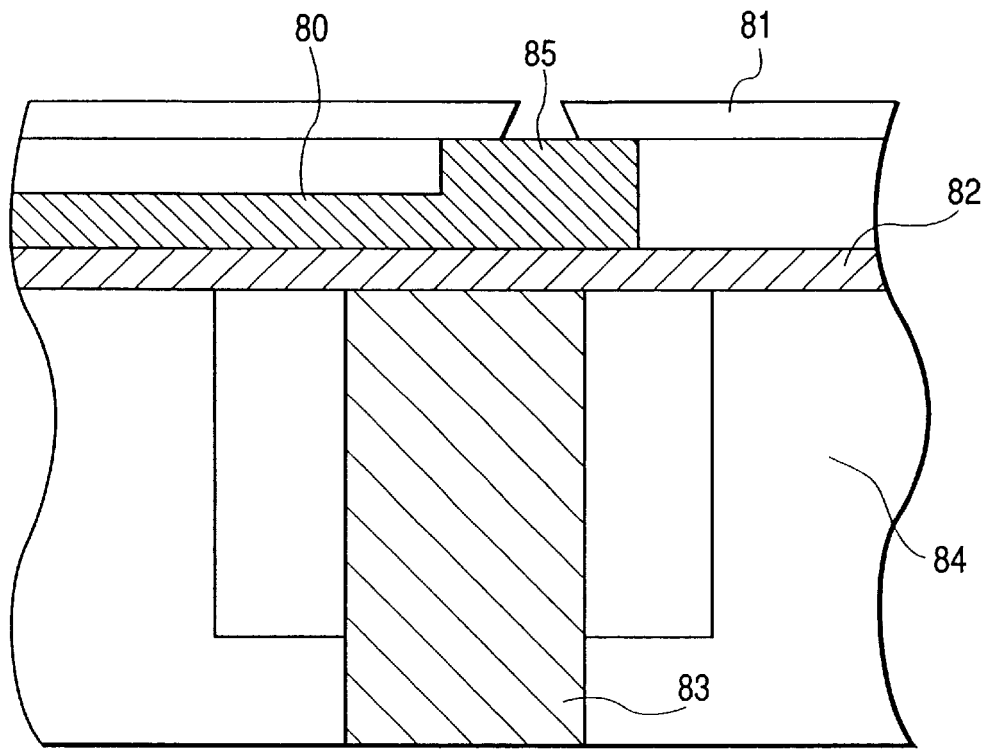
FIG. 7 is a schematic sectional view showing constitution of another ink-jet recording head.

FIG. 7 shows an example of the constitution of the recording head which is the main portion of the recording apparatus. This head is constituted of an ink flow path 80 communicating with an ink chamber (not shown in the drawing), an orifice plate 81 for ejecting a prescribed volume of the ink droplets, a vibration plate 82 for exerting pressure directly to the ink, a piezo-electric element 83 joined to the vibration plate 82 and displacing in response to electric signals, and a substrate 84 for fixing the orifice plate 81, the vibration plate 82, and so forth.

In FIG. 7, the ink flow path 80 is formed from a photosensitive resin, or a like material. An ejection orifice 85 is formed through the orifice plate 81 from a metal such as stainless steel, and nickel by boring by electrocasting or press working, or like processing. The vibration plate 82 is formed from a film of a metal such as stainless steel, nickel, and titanium, or a film of high-elasticity resin. The piezo-electric element 83 is made from a dielectric material such as barium titanate, and PZT. In the recording head of the above constitution, pulsed voltage is applied to the piezo-electric element 83 to cause deformation stress therein to deform the vibration plate joined to the piezo-electric element 83, whereby the ink in the ink flow path 80 is pressurized vertically to eject ink droplets (not shown in the drawing) to conduct recording. Such a recording head can be used by incorporation into a recording apparatus similar to that shown in FIG. 4. The recording apparatus with such a recording head may be driven in the same manner as described before.

Figure 8:
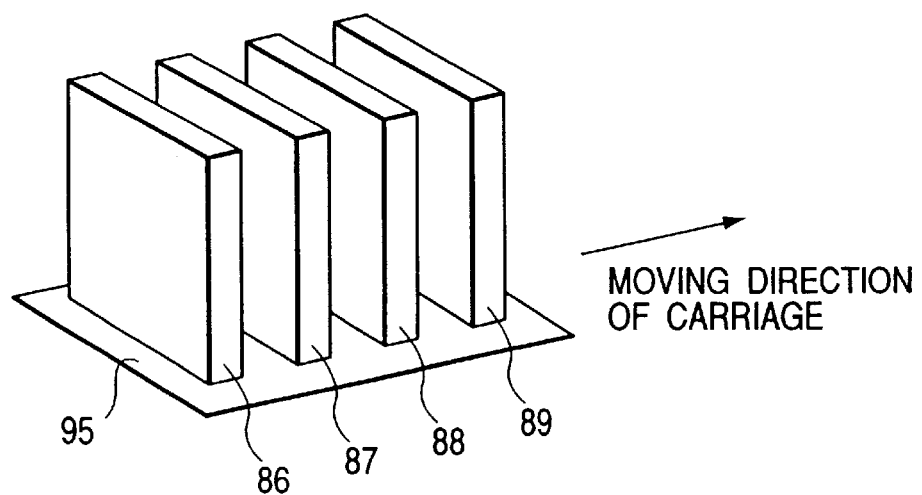
FIG. 8 is a schematic view of an ink set.
Figure 9:
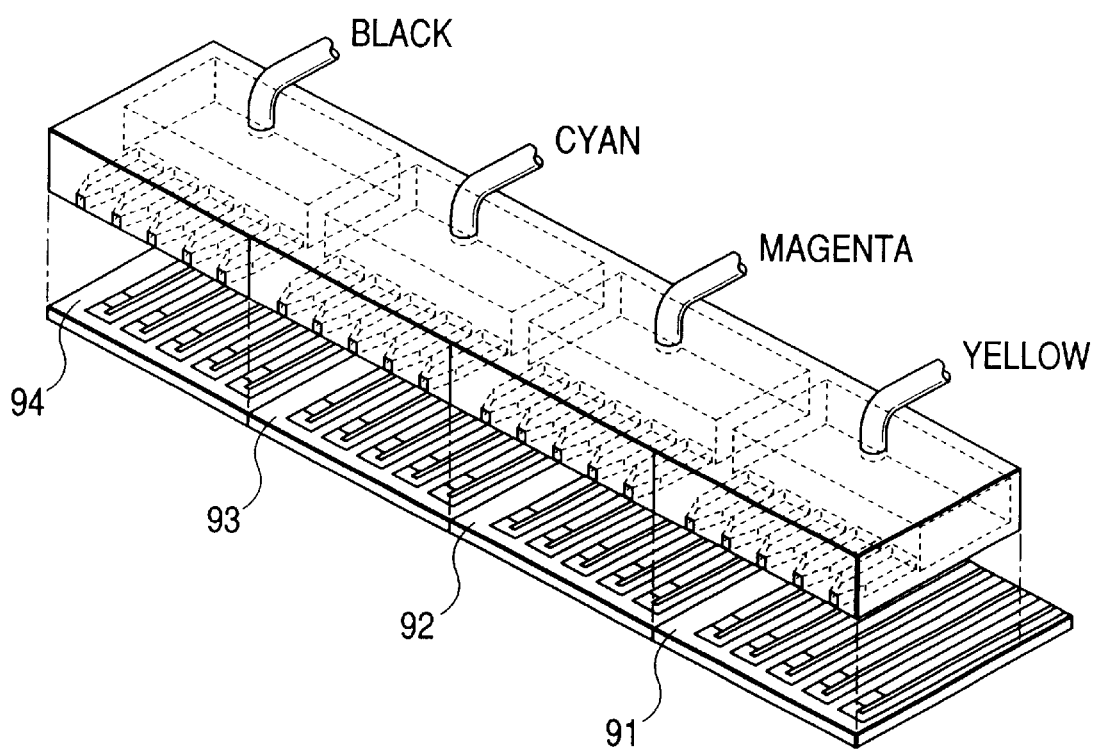
FIG. 9 is a schematic view of another ink set.

The above described ink sets are used for color image formation by a recording apparatus having four recording heads as shown in FIG. 3 on a carriage. FIG. 9 shows an example, in which the recording units 91, 92, 93, 94 eject respectively an ink of yellow, magenta, cyan, and black. The recording units are placed on the carriage of the aforementioned recording apparatus, and eject the respective color inks in accordance with recording signals. The example shown by FIG. 9 employs four recording units. However, the present invention is not limited thereto. For example, as shown in FIG. 8, the recording is conducted by use of a recording head 95 which has separate ink flow paths provided for ejecting the respective colors of the ink supplied from the ink cartridges 86–89.

The present invention, as described above, enables printing of high-quality image having excellent water resistance and excellent abrasion resistance with less feathering and less bleeding without conducting light irradiation or the like treatment after the printing.

The present invention is described below in more detail by reference to examples. In the Examples the unit "parts" is based on weight unless otherwise mentioned.

EXAMPLE 1

A first liquid composition and a second liquid composition (ink) were prepared which have the constitutions shown below.

First Liquid Composition:

| Compound A-8 | 20 parts |
| Water | 80 parts |

Second Liquid Composition:

| Polyethylenimine (Compound B-3) (number-average molecular weight: 13500) | 20 parts |
| C.I. Direct Black 168 | 3.5 parts |
| Water | 76.5 parts |

The ink set comprising the first liquid composition and the second composition is tested for printing by means of an ink-jet printer (trade name: BJC700J, Canon Inc.). The first liquid composition and the second composition were charged respectively to two print heads. Electrophotographic copying paper sheets (non-coat paper, trade name: PB Paper, Canon Inc.) were set in this printer. A document containing characters and patterns was printed thereon. In the printing, the second liquid composition was applied firstly onto the paper sheet, and then the first liquid composition was applied onto the ink-printed area in superposition with a time-lag of about 1/50 second. The first liquid composition and the second liquid composition came to be mixed sufficiently on the paper sheet. The obtained print was left standing for one day in a usual office environment conditions (temperature: 25° C., humidity: 50%). Then the print was evaluated for dot definition, water resistance, and marking-pen resistance according to the methods below. Table 3 shows the results.

Dot Definition:

The dots printed on the paper sheet were examined visually for the concentration and occurrence of beard-like feathering.

Water Resistance:

Water was sprayed onto the print, and the print was kept tilted. Occurrence of feathering was observed.

Marring-pen Resistance:

The printed portion was traced with a yellow marking pen (trade name: ZEBRA fluorescence PEN2, Zebra Co.). Traced portion was examined visually for occurrence of turbidness.

COMPARATIVE EXAMPLE 1

Printing was conducted in the same manner as in Example 1 except that the second liquid composition was changed to the ink having the constitution below.

Ink in Comparative Example 1:

| | |
|---|---|
| C.I. Direct Black 168 | 3.5 parts |
| Diethylene glycol | 15 parts |
| Water | 81.5 parts |

Table 3 shows the results.

EXAMPLE 2

An ink set was prepared which comprised a first liquid composition and a second liquid composition having the constitutions shown in Table 4. With this ink set, printing was conducted in the same manner as in Example 1 except that the first liquid composition was applied first and then the second liquid composition was applied. Table 5 shows the results.

EXAMPLE 3

An ink set was prepared which comprised a first liquid composition and second liquid compositions having the constitutions shown in Tables 6 and 7.

The four inks were charged respectively into print heads of an ink-jet color printer (trade name; BJF-800, Canon Inc.). In the printing, on the black-ink-applied portion, any one of the color inks was applied in superposition to cause reaction between the first compound (A-3) and the second compound (B-1). The recording medium was plain paper sheets for electrophotography, and two types of gloss paper sheets for ink-jet recording (trade names, GP-301, and HG-201, Canon Inc.)

The print was evaluated for water resistance, abrasion resistance, marking-pen resistance, and reflectivity of the printed characters. The liquid compositions were evaluated for clogging liableness and ejection stability. The evaluation standards are shown below.

Water Resistance:
Water is sprayed onto the print, and the print was kept tilted. Occurrence of feathering is observed.

Excellent: No change is observed in the print quality, and print is definite without ink feathering.

Fair: No change is observed in the print quality, but the wetted characters become feathered by wiping.

Poor: The characters are kept decipherable, but feathering is caused.

Abrasion Resistance:
The printed character is rubbed five times with a commercial stationery rubber in a manner to erase the characters, and the state of the characters is examined.

Excellent: Little change is observed in the density of the characters.

Fair: The characters becomes less dense, but are not completely erased.

Poor: The characters are completely erased by strong rubbing.

Marking-pen Resistance:
The printed portion is traced with a yellow marking pen (trade name: ZEBRA fluorescence PEN2, Zebra Co.). Traced portion is examined visually for occurrence of turbidity.

Excellent: No feathering of the printed characters is observed, and no transfer of the ink to the felt of the marking pen is observed.

Fair: No feathering of the printed characters is observed, but transfer of the ink to the felt of the marking pen is observed.

Poor: Non-printed region in the periphery of the characters becomes turbid, and the yellow ink and the black ink are come to be mixed to make the characters less decipherable.

Clogging Liableness:
After the printing, the printer nozzle is capped and is left standing for one day. Then the printing is started again, and the ejection state through the nozzle and the regularity of the dots are examined.

Excellent: Ejection is normal, and no irregularity of the dots is caused.

Fair: The ejection can be conducted, but some irregularity of the dots is observed at the initial stage of re-start of the printing.

Poor: The ejection can be conducted, but irregularity of the dots is observed and the irregularity cannot be restored by cleaning of the nozzle.

Ejection Stability:
With an ink tank holding 15-mL of ink, 50 pages of a document is printed. Thereafter, the decrease of the density of a solid pattern and the definition of the printed characters are examined.

Excellent: No change is observed in density of the solid pattern and the definition of the printed characters during the printing.

Fair: The density of the solid pattern becomes lower by about 10% by the end of the printing.

Poor: The density becomes lower, and the printed characters become blurred.

COMPARATIVE EXAMPLE 2

For Comparison with Example 3, the same ink set as in Example 3 was prepared except that the first liquid composition was changed to the black ink having the constitution shown below, and the printing test was conducted in the same manner as in Example 3.

Black ink in Comparative Example 2:

| | |
|---|---|
| Self-dispersing type carbon black component (trade name: Cabojet 300, Cabot Co.) | 6 parts |
| Triethylene glycol | 15 parts |
| Water | 79 parts |

Table 8 shows the results.

COMPARATIVE EXAMPLE 3

For Comparison with Example 3, the same ink set as in Example 3 was prepared except that the first liquid composition was changed to the black ink having the constitution shown below, and the printing test was conducted in the same manner as in Example 3.

Black ink in Comparative Example 3:

Self-dispersing type carbon black component 6 parts (trade name: Cabojet 300, Cabot Co.)

Aqueous solution of styrene-acrylic acid copolymer amine salt

| | |
|---|---|
| (concentration: 20 wt %, number-average molecular weight: 3500 acid value: 230) | 25 parts |
| Triethylene glycol | 15 parts |
| Water | 54 parts |

Table 8 shows the results.

EXAMPLE 4

An ink set composed of the first liquid composition and the second liquid composition having constitutions shown in Tables 9 and 10. Color printing was conducted with the ink set by means of a color ink-jet printer (trade name: BJC700J, Canon Inc.) on an electrophotographic copying paper sheet, and an ink-jet glossy paper sheet (trade name: GP301, Canon Inc.) as the recording medium.

In the printing, the second liquid compositions of the respective colors were applied on the prescribed positions on the recording medium, and thereon the first liquid composition was applied to allow the first compound to react with the second compound.

The prints obtained in Example 4 by use of plain paper sheets and glossy paper sheets were excellent in water resistance, abrasion resistance, and marking-pen resistance. In particular, even with a water-soluble dye which does not usually give water resistance with an ink additive, the remarkably high water resistance of the print could be achieved with the dot density maintained.

EXAMPLE 5

An ink set was prepared in the same manner as in Example 4 except that the first liquid composition was changed to the ink having the constitution shown in Table 11, and printing test was conducted in the same manner as in Example 4.

The prints obtained in Example 5 by use of plain paper sheets and glossy paper sheets were greatly improved in abrasion resistance, and marking-pen resistance. Even with an aqueous pigment ink which does not always give sufficient adhesiveness of the ink to the recording medium, the related performances were greatly improved by the present invention.

EXAMPLE 6

A first liquid composition and a second liquid composition were prepared as shown in Tables 12 and 13.

These inks were charged respectively into print heads of an ink-jet color printer (trade name: BJF-800, Canon Inc.). In the printing, the second liquid composition was preliminarily applied in prescribed positions, and thereon one of the color inks was applied in superposition. Thereby, all of the respective inks caused reaction on the recording paper sheet. The recording medium was plain paper sheets for electrophotography, and two types of glossy paper sheets for ink-jet recording (trade names, GP-301, and HG-201, Canon Inc.)

The print was found to be excellent in water resistance and marking-pen resistance of the dye ink, and in abrasion resistance and marking-pen resistance of the black pigment ink.

EXAMPLE 7

A first liquid composition and a second liquid composition were prepared as shown in Tables 14 and 15.

These inks were charged respectively into print heads of an ink-jet color printer (trade name: BJF-800, Canon Inc.). In the printing, any of the color inks was applied in dots onto prescribed positions before application of the black ink, and thereon the black ink was applied in superposition. The printing was conducted at a highest-speed printing mode so as to complete every dot by two-scan reciprocation of the head. The recording medium was plain paper sheets for electrophotography, and two types of glossy paper sheets for ink-jet recording (trade names, GP-301, and HG-201, Canon Inc.).

Thus a sharp color image could be obtained without bleeding at the boundary of the black print area and the color print area. The water resistance and the abrasion resistance were excellent at the black character portions.

EXAMPLE 8

A first liquid composition and a second liquid composition were prepared as shown in Tables 16 and 17.

Black ink 1 shown in Table 16 was applied to form eight solid patterns of 3 cm×3 cm on an ink-jet glossy paper sheet (trade name: GP301, Canon K.K.) by means of an ink-jet printer (trade name: BJF-600, Canon K.K.). Immediately after that, on four patterns out of the above eight patterns, the second liquid composition having the constitution shown in Table 17 was applied in half an amount of Black Ink 1 used for the solid pattern. The printed glossy paper sheet was left standing indoors for 24 hours, and the hues of the respective solid patterns were measured. This printed paper sheet was placed in an atmosphere of 3 ppm ozone in an ozone testing apparatus for two hours. The hues of the respective solid patterns were measured again. Thereby, the color differences of the patterns with the second liquid composition applied was compared with the color differences of the patterns with the second liquid not applied.

The same tests were conducted for other inks shown in Table 16.

Table 18 shows the results.

EXAMPLE 9

Transparent inks containing no coloring material were prepared as below.

First Transparent Ink:

| Compound A-3 | 30% by weight |
|---|---|
| Water | 70% by weight |

Second Transparent Ink:

| Epomine SP-012 | 30% by weight |
|---|---|
| Water | 70% by weight |

The two inks were charged respectively to two ink-jet printer head, and solid printing was conducted in two manners.

In one printing test, the first transparent ink (first liquid composition) and the second transparent ink (second liquid composition) were applied on an ink-jet recording glossy film (trade name: HG-201, Canon Inc.) having an image formed thereon so as to cause mixing of the transparent inks in a liquid state on the film surface. The amount of the inks applied was 20 mL/m$^2$ in total. After 24 hours of standing, the image was evaluated. The polymeric compound film formed by the reaction of the first compound with the second compound on the glossy film was less scratchable, and the discoloration of the image was remarkably retarded during storage in an indoor environment.

In another printing test, on an OHP film for electrophotography, fine rectangular patterns were printed with the two inks to form patterned rising portions. The formed transparent rectangular patterns gave much more recess-projection feeling then that formed by printing with a usual ink. From the results, rising patterns can be printed on a non-permeable substrate with the inks of the present invention, advantageously.

TABLE 1

| Compound | Solubility | Time for gel formation (seconds) |
|---|---|---|
| A-1 | ca 10% | 15 |
| A-2 | >30% | 10 |
| A-3 | >30% | 20 |
| A-4 | ca 30% | 10 |
| A-5 | >30% | 20 |
| A-6 | >30% | 25 |
| A-7 | >30% | 25 |
| A-8 | >30% | 25 |
| A-9 | ca 10% | 60 |
| A-10 | ca 20% | 10 |
| A-11 | >30% | 20 |
| A-12 | >30% | 20 |
| B-1 (n + m + k = 3) | >30% | 30 |
| B-1 (n + m + k = 9) | >30% | 30 |
| B-1 (n + m + k = 15) | >30% | 30 |
| B-2 (n + m + k = 3) | >30% | 600 |
| B-2 (n + m + k = 25) | >30% | 600 |
| B-3 (polymn deg*: n = 7) | >30% | 60 |
| B-3 (Epomin SP-012) | >30% | 15 |
| B-3 (Epomin SP-008) | >30% | 15 |
| B-3 (Lupasol FG) | >30% | 15 |
| B-4 | 20% | 600 |
| B-5 | 20% | 600 |
| B-6 | 20% | 600 |
| B-7 (n = 4) | 10% | 300 |
| B-8 | >30% | 600 |
| B-9 | >30% | 600 |
| B-10 | >30% | 600 |

*polymerization degree

TABLE 2

| | First liquid composition | | | Second liquid composition | | |
|---|---|---|---|---|---|---|
| | No coloring material | Coloring material | | No coloring material | Coloring material | |
| | | Black | Color | | Black | Color |
| Ink Set 1 | | x | | | x | |
| Ink Set 2 | x | | | | | x |
| Ink Set 3 | | x | | | x | |
| Ink Set 4 | | x | | | | x |
| Ink Set 5 | | | x | | x | |
| Ink Set 6 | | | x | x | | |
| Ink Set 7 | | | x | | | x |
| Ink Set 8 | x | | | | | x |
| Ink Sets 9* | x | | | x | | |

*Ink Sets 9 have an ink or inks containing a coloring material in addition to the first liquid composition and the second liquid composition.

TABLE 3

| | Example 1 | Comparative Example 1 |
|---|---|---|
| Dot definition | Hiqh density, High definition | High density, High definition |
| Water resistance | No change of print quality, No ink bleeding, Definite | Characters being decipherable, Black turbidness occurring at periphery of characters |
| Marking-pen resistance | No turbidness occurred | Turbidness in non-printed portions |

TABLE 4

| First liquid composition | | Second liquid composition (Black ink) | |
|---|---|---|---|
| Compound A-1 | 15 aprts | Compound B-3 | 10 parts |
| Diethylene glycol | 10 parts | C.I. Direct Black 168 | 3.5 parts |
| N-Methyl-2-pyrrolidone | 7 parts | Diethylene glycol | 15 parts |
| Water | 68 parts | Water | 71.5 parts |

TABLE 5

| | Example 2 |
|---|---|
| Dot definition | High density, High definition |
| Water resistance | No change of print quality, No ink bleeding, Definite |
| Marking-pen resistane | No turbidness caused by marker pen |

TABLE 6

| First liquid composition (black ink) | |
|---|---|
| Compound A-3 | 15 parts |
| Self dispersing type carbon black disperse component (trade name: Cabojet 300, Cabot Co.) | 6 parts |
| Triethylene glycol | 15 parts |
| Water | 64 parts |

TABLE 7

| | Second liquid composition | |
|---|---|---|
| Blue ink | C.I. Direct Blue 199 | 3 parts |
| | Compound B-1 (n + m + k = 9) | 12 parts |
| | Diethylene glycol | 10 parts |
| | N-Methyl-2-pyrrolidone | 7 parts |
| | Water | 68 parts |
| Yellow ink | C.I. Direct Yellow 132 | 5 parts |
| | Compound B-1 (n + m + k = 9) | 12 parts |
| | Diethylene glycol | 10 parts |
| | N-Methyl-2-pyrrolidone | 7 parts |
| | Water | 66 parts |
| Magenta ink | C.I. Acid Red 52 | 4 parts |
| | Compound B-1 (n + m + k = 9) | 12 parts |
| | Diethylene glycol | 10 parts |
| | N-Methyl-2-pyrrolidone | 7 parts |
| | Water | 67 parts |

TABLE 8

| | Example | Comparative Example | |
|---|---|---|---|
| | 3 | 2 | 3 |
| Water resistance | Excellent | Fair | Excellent |
| Abrasion resistance | Excellent | Poor | Fair |
| Marking-pen resistance | Excellent | Poor | Fair |

TABLE 8-continued

|  | Example | Comparative Example | |
|---|---|---|---|
|  | 3 | 2 | 3 |
| Reflection density of characters | Excellent | Excellent | Excellent |
| Non-clogging | Excellent | Excellent | Poor |
| Ejection stability | Excellent | Excellent | Poor |

TABLE 9

| First liquid composition | | |
|---|---|---|
| Blue ink | C.I. Direct Blue 199 | 3 parts |
|  | Compound A-6 | 10 parts |
|  | Water | 87 parts |
| Yellow ink | C.I. Direct Yellow 132 | 5 parts |
|  | Compound A-6 | 10 parts |
|  | Water | 85 parts |
| Magenta ink | C.I. Acid Red 52 | 4 parts |
|  | Compound A-6 | 10 parts |
|  | Water | 66 parts |
| Black | Carbon black dispersion* | 30 parts |
|  | Compound A-6 | 10 parts |
|  | Water | 60 parts |

*Dispersion of Carbon Black #960 (trade name: High Color Carbon, Mitsubishi Chemical Co.) Aqueous dispersion of carbon black, dispersed by a polymer of vinylnaphthalenesulfonic acid neutralized by triethanolamine, Pigment concentration: 20%

TABLE 10

| Second liquid composition | |
|---|---|
| Polyethlenimine* | 20 parts |
| Water | 80 parts |

*trade name: Epomine SP1500, Nippon Shokubai Kagaku K.K.

TABLE 11

| First liquid composition | | | |
|---|---|---|---|
| Blue ink | Aqueous dispersion of copper phthalocyanine *1 | 25 parts | (pigment: 4 parts) |
|  | Compound A-6 | 10 parts |  |
|  | Water | 65 parts |  |
| Yellow ink | Aqueous dispersion of Pigment Yellow 128 *2 | 50 parts | (pigment: 5 parts) |
|  | Compound A-6 | 10 parts |  |
|  | Water | 40 parts |  |
| Magenta ink | Aqueous dispersion of Pigment Red 122 *3 | 27 parts | (pigment: 4 parts) |
|  | Compound A-6 | 10 parts |  |
|  | Water | 63 parts |  |
| Black | Carbon black dispersion *4 | 30 parts | (pigment: 6 parts |
|  | Compound A-6 | 10 parts |  |
|  | Water | 60 parts |  |

*1 Dispersant: styrene-maleic acid copolymer: molecular weight 3500, acid value 320, aqueous dispersion of 16% pigment solid content

*2 Dispersant: styrene-maleic acid copolymer: molecular weight 3500, acid value 320, aqueous dispersion of 10% pigment solid content

*3 Dispersant: styrene-maleic acid copolymer: molecular weight 3500, acid value 320, aqueous dispersion of 15% pigment solid content

*4 Dispersion of Carbon Black #960 (trade name: High Colr Carbon, Mitsubishi Chemical Co.) Dispersant: styrene-maleic acid copolymer: molecular weight 3500, acid value 320, aqueous dispersion of 20% pigment solid content

TABLE 12

| First liquid composition | | |
|---|---|---|
| Blue ink | C.I. Direct Blue 199 | 3 parts |
|  | Compound A-2 | 10 parts |
|  | Diethylene glycol | 10 parts |
|  | N-Methyl-2-pyrrolidone | 7 parts |
|  | Water | 60 parts |
| Yellow ink | C.I. Direct Yellow 132 | 5 parts |
|  | Compound A-2 | 10 parts |
|  | Diethylene glycol | 10 parts |
|  | N-Methyl-2-pyrrolidone | 7 parts |
|  | Water | 68 parts |
| Magenta ink | C.I. Acid Red 52 | 4 parts |
|  | Compound B-1 (n + m + k = 9) | 10 parts |
|  | Diethylene glycol | 10 parts |
|  | N-Methyl-2-pyrrolidone | 7 parts |
|  | Water | 69 parts |

TABLE 13

| Second liquid composition (black ink) | |
|---|---|
| Compound B-6 | 15 parts |
| Self-dispersing type carbon black disperse component (trade name: Cabojet 300, Cabot Co.) | 5 parts (solid matter) |
| Triethylene glycol | 15 parts |
| Water | 65 parts |

TABLE 14

| First liquid composition (black ink)/ pH = 3.5 | | |
|---|---|---|
| Compound A-2 | 8 parts | |
| Cationic carbon black dispersion (trade name: IJX-55, Cabot Co.) | 5 parts | (solid matter) |

TABLE 14-continued

| First liquid composition (black ink)/ pH = 3.5 | |
| --- | --- |
| Diethylene glycol | 15 parts |
| Water | 72 parts |

TABLE 15

| Second liquid composition | | |
| --- | --- | --- |
| Blue ink/ pH = 12.5 | C.I. Direct Blue 199 | 3.5 parts |
| | Triethylenetetramine (second compound) | 17 parts |
| | Triethylene glycol | 20 parts |
| | Water | 60 parts |
| Yellow ink/ pH = 12.2 | C.I. Direct Yellow 132 | 6 parts |
| | Triethylenetetramine (second compound) | 17 parts |
| | Triethylene glycol | 20 parts |
| | Water | 68 parts |
| Magenta ink/ pH = 12.3 | C.I. Acid Red 52 | 4 parts |
| | Triethylenetetramine (second compound) | 17 parts |
| | Triethylene glycol | 20 parts |
| | Water | 59 parts |

TABLE 16

| First liquid composition | | |
| --- | --- | --- |
| Black Ink 1/ pH = 8.0 | C.I. Food Black 2 | 3.0 parts |
| | Compound A-6 | 20 parts |
| | 1,3-propanediol | 5 parts |
| | Water | 72 parts |
| | pH adjuster | small amount |
| Black Ink 2/ pH = 8.5 | C.I. Direct Black 168 | 2.8 parts |
| | Compound A-6 | 20 parts |
| | 1,3-propanediol | 5 parts |
| | Water | 72.2 parts |
| | pH adjuster | small amount |
| Black Ink 3/ pH = 9.0 | C.I. Direct Black 195 | 2.5 parts |
| | Compound A-6 | 20 parts |
| | 1,3-propanediol | 5 parts |
| | Water | 72.5 parts |
| | pH adjuster | small amount |
| Cyan Ink 1/ pH = 8.5 | C.I. Direct Blue 199 | 2.0 parts |
| | Compound A-6 | 20 parts |
| | 1,3-propanediol | 5 parts |
| | Water | 73 parts |
| | pH adjuster | small amount |
| Cyan Ink 2/ pH = 8.5 | C.I. Direct Blue 85 | 2 parts |
| | Compound A-6 | 20 parts |
| | 1,3-propanediol | 5 parts |
| | Water | 73 parts |
| | pH adjuster | small amount |
| Cyan Ink 3/ pH = 9.5 | Projet Cyan 2 | 2 parts |
| | Compound A-6 | 20 parts |
| | 1,3-propanediol | 5 parts |
| | Water | 73 parts |
| | pH adjuster | small amount |

TABLE 17

| Second liquid composition (colorless ink)/ pH = 11.0 | |
| --- | --- |
| Compound B-1 (Lupasol FG) | 25 parts |
| Water | 75 parts |

TABLE 18

| Ink | Color difference without second liquid composition | Color difference with second liquid composition applied |
| --- | --- | --- |
| Black Ink 1 | 30.2 | 3.6 |
| Black Ink 2 | 23.3 | 4.5 |
| Black Ink 3 | 39.6 | 5.3 |
| Cyan Ink 1 | 25.4 | 6.6 |
| Cyan Ink 2 | 24.3 | 6.0 |
| Cyan Ink 3 | 30.8 | 5.7 |

What is claimed is:

1. A set of liquid compositions, comprising a first liquid composition containing a first water-soluble compound having in the molecule two or more ethylenically unsaturated double bonds having an electron-attractive substituent on the α-position, and a second liquid composition containing a second water-soluble compound having an active hydrogen atom addable to the first compound in coexistence; at least one of the first liquid composition and the second liquid composition further containing a coloring material.

2. The set of liquid compositions according to claim 1, wherein the second compound has two or more active hydrogen atoms addable to the first compound.

3. The set of liquid compositions according to claim 1, wherein the second compound has two or more amino groups selected from the group consisting of primary amino groups and secondary amino groups.

4. The set of liquid compositions according to claim 1, wherein the first liquid composition is a black ink, and the second liquid composition is a liquid having a color tone not substantially affecting the color tone of a printed article obtained with the first liquid composition.

5. The set of liquid compositions according to claim 1, wherein the second liquid composition is a black ink, and the first liquid composition has a color tone not substantially affecting the color tone of a printed article obtained with the second liquid composition.

6. The set of liquid compositions according to claim 1, wherein the first liquid composition and the second liquid composition are respectively a black ink.

7. The set of liquid compositions according to claim 1, wherein one of the first liquid composition and the second liquid composition is a color ink, and the other is a black ink.

8. The set of liquid compositions according to claim 1, wherein the first liquid composition is a color ink, and the second liquid composition is a liquid having a color tone not substantially affecting the color tone of a printed article obtained with the first liquid composition.

9. The set of liquid compositions according to claim 1, wherein the second liquid composition is a color ink, and the first liquid composition is a liquid having a color tone not substantially affecting the color tone of a printed article obtained with the second liquid composition.

10. The set of liquid compositions according to any one of claims 6 to 9, wherein the color ink is at least one selected from the group consisting of yellow inks, cyan inks, and magenta inks.

11. The set of liquid compositions according to claim 1, wherein the first liquid composition and the second liquid composition are respectively a color ink.

12. The set of liquid compositions according to claim 11, wherein the color of the first liquid composition as the color ink is different from the color of the second liquid composition as the color ink.

13. The set of liquid compositions according to claim 12, wherein the color inks are at least two color inks having respectively a color selected from the group consisting of yellow, cyan, and magenta.

14. The set of liquid compositions according to claim 1, wherein the first compound is at least one selected from the group consisting of compounds represented by Formulas A-1 to A-12, and the second compound is at least one selected from the group consisting of compounds represented by Formulas B-1 to B-17:

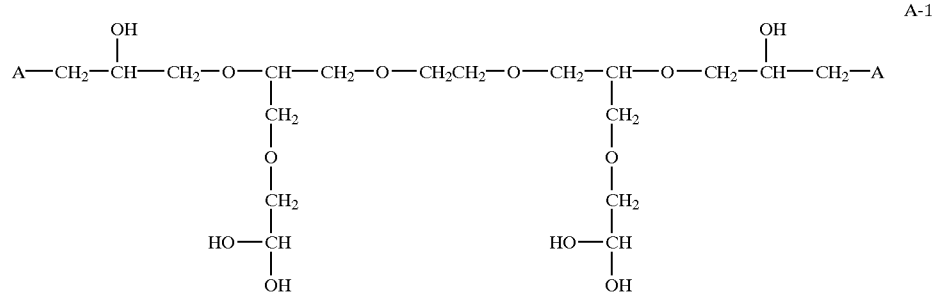

where A is CH=C(X)—C(=O)—O, and X is H or $CH_3$

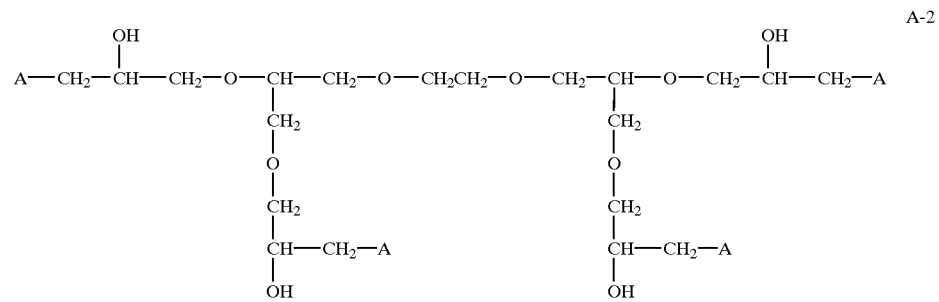

where A is CH=C(X)—C(=O)—O, and X is H or $CH_3$

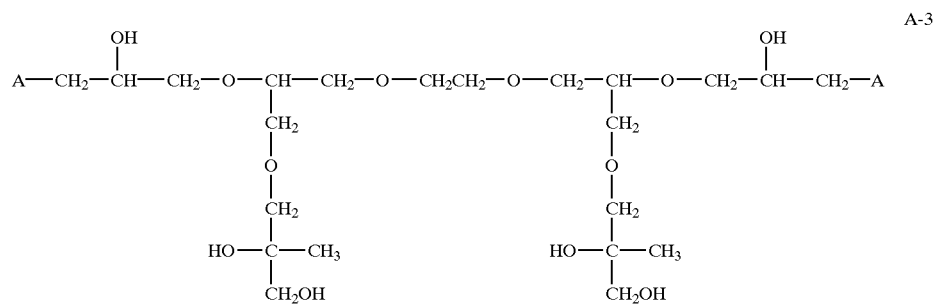

where A is CH=C(X)—C(=O)—O, and X is H or CH₃
A-4
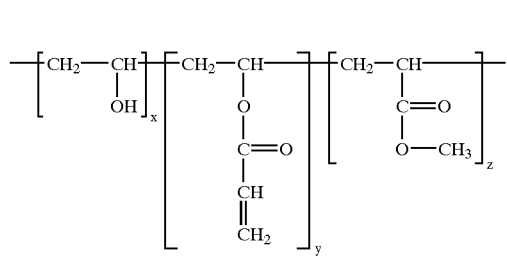
where x, y and z are respectively an integer in the range of x=10–100, y=3–25, and z=5–25
A-5
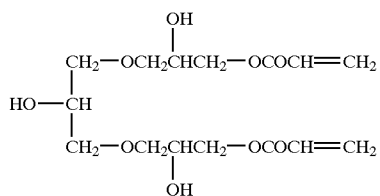
A-6
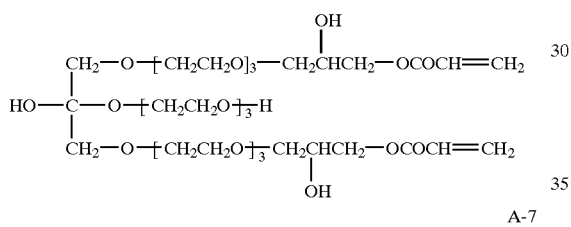
A-7
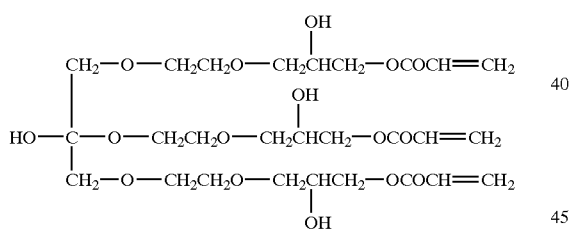
A-8
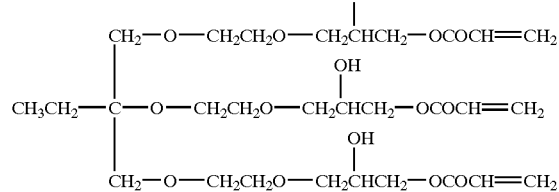
A-9
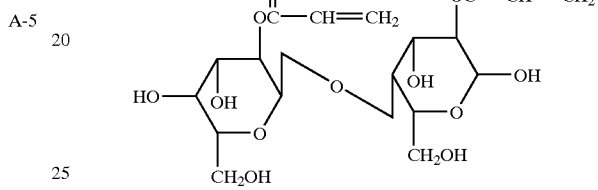
A-10
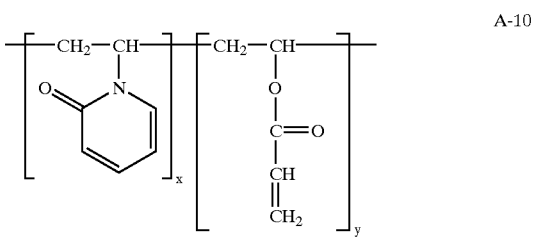
where x and y are respectively an integer in the range of x=10–25, and y=3–15
A-11
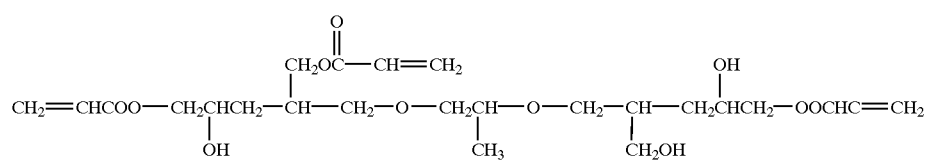
A-12
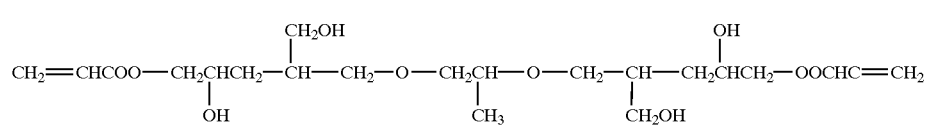

-continued

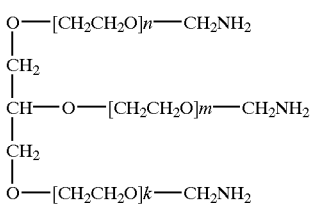

where n+m+k is in the range of 0–25

    B-2 where n is in the range of 3–25, and $R_1$ is an alkyl of 1–3 carbons

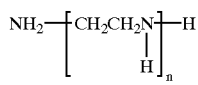    B-3 where n is in the range of 7–1000

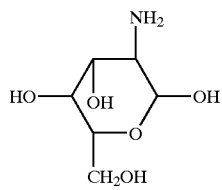    B-4

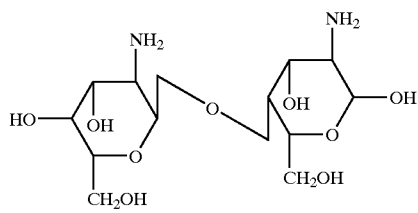    B-5

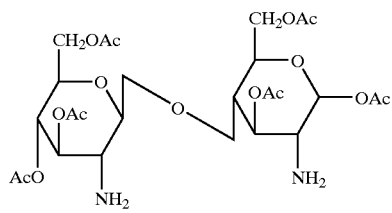    B-6

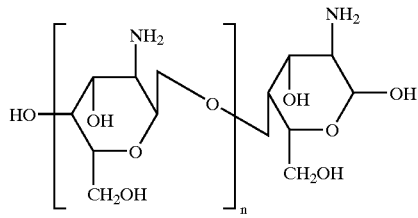    B-7 where n is in the range of 3–25

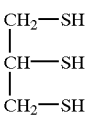    B-8

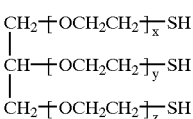    B-9 where x+y+z is in the range of 1–15

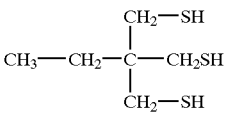    B-10

HS—$CH_2CH_2$—SH    B-11

HS—$CH_2CH_2OCH_2CH_2$—SH    B-12

HS—$CH_2CH_2OCH_2CH_2$—$OCH_2CH_2$—SH    B-13

HS—[$CH_2CH_2O$]$_n$—$CH_2CH_2$—SH    B-14 where n is in the range of 3–16

HS—$CH_2CH_2CH_2CH_2$—SH    B-15

HS—$CH_2CH_2CH_2CH_2CH_2$—SH    B-16

HS—$CH_2CH_2CH_2CH_2CH_2CH_2$—SH.    B-17

15. A set of liquid compositions and an ink, comprising a first liquid composition containing a first water-soluble compound having in the molecule two or more ethylenically unsaturated double bonds having an electron-attractive substituent on the α-position, a second liquid composition containing a second water-soluble compound having an active hydrogen atom addable to the first compound in coexistence, and an ink containing a coloring material.

16. The set of liquid compositions and an ink according to claim 15, wherein the ink is a black ink.

17. The set of liquid compositions and an ink according to claim 15, wherein the ink is a color ink.

18. The set of liquid compositions and an ink according to claim 17, wherein the color ink is at least one selected from the group consisting of yellow inks, cyan inks, and magenta inks.

19. The set of liquid compositions and an ink according to any one of claims 15 to 18 wherein the first liquid composition and the second liquid composition respectively have a color tone not substantially affecting the color tone of a printed article obtained with the ink.

20. The set of liquid compositions and an ink according to claim 15, wherein the second compound has two or more active hydrogen atoms addable to the first compound.

21. The set of liquid compositions and an ink according to claim 20, wherein the second compound has two or more amino groups selected from the group consisting of primary amino groups and secondary amino groups.

22. The set of liquid compositions and an ink according to claim 15, wherein the first compound is at least one selected from the group consisting of compounds represented by Formulas A-1 to A-12, and the second compound is at least one selected from the group consisting of compounds represented by Formulas B-1 to B-17:

where A is CH=C(X)—C(=O)—O, and X is H or $CH_3$

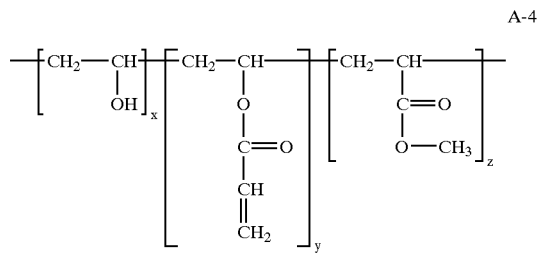

A-4

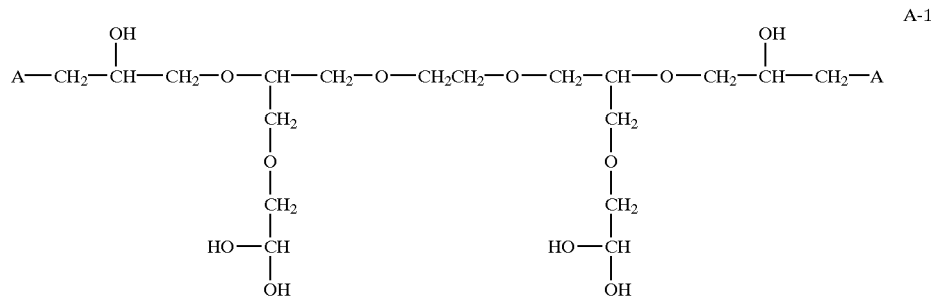

A-1 where A is CH=C(X)—C(=O)—O, and X is H or $CH_3$

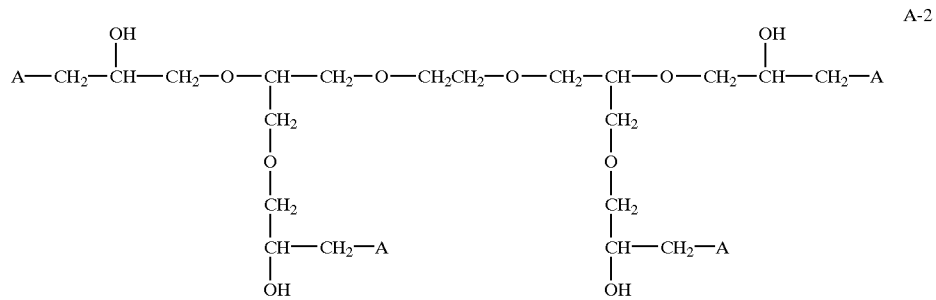

A-2 where A is CH=C(X)—C(=O)—O, and X is H or $CH_3$

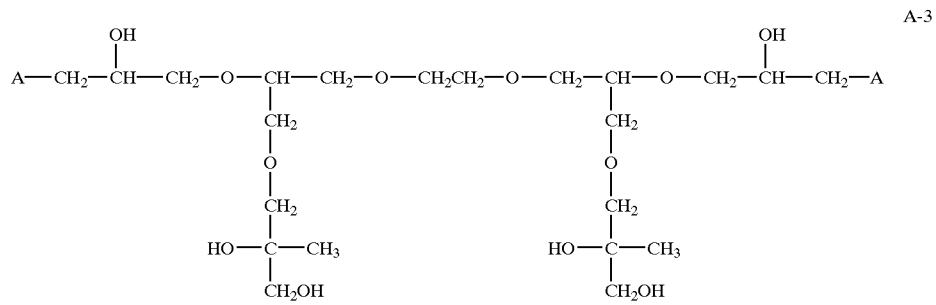

A-3 where x, y and z are respectively an integer in the range of x=10–100, y=3–25, and z=5–25
A-5
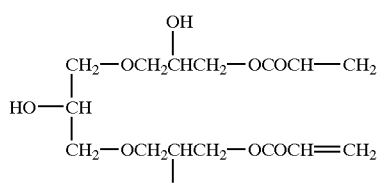
A-6
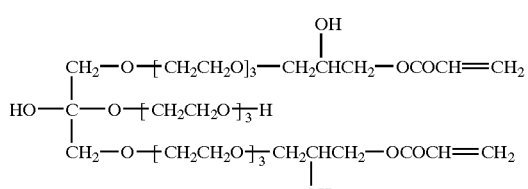
A-7
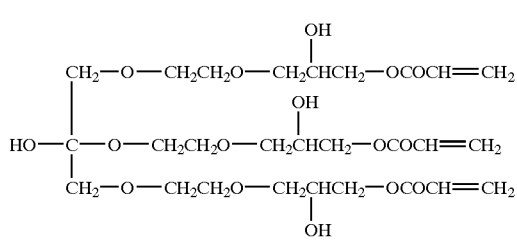
A-9
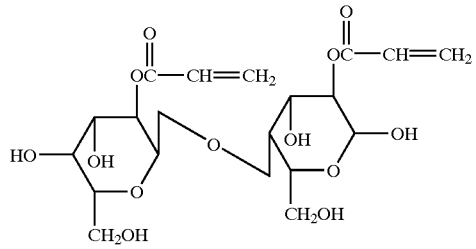
A-10
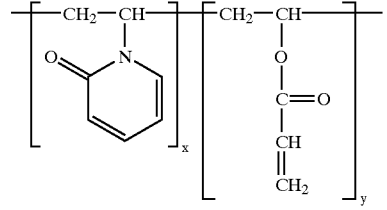
where x and y are respectively an integer in the range of x=10–25, and y=3–15
A-11
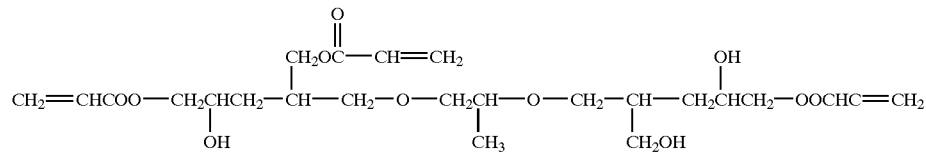
A-12
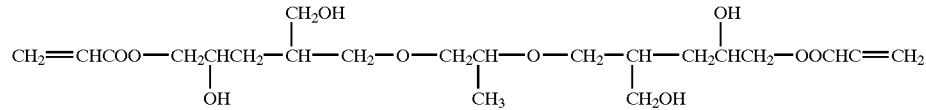
B-1
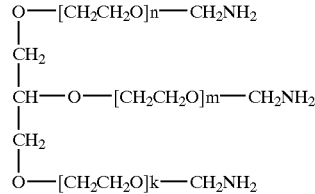
where n+m+k is in the range of 0–25
B-2
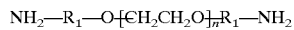
where n is in the range of 3–25, and $R_1$ is an alkyl of 1–3 carbons
-continued
A-8
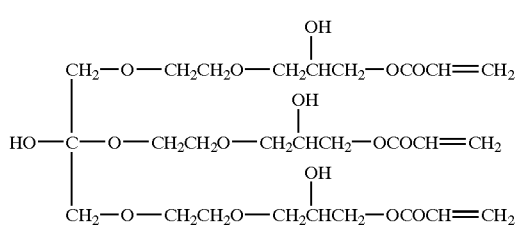
B-3
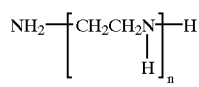

where n is in the range of 7–1000

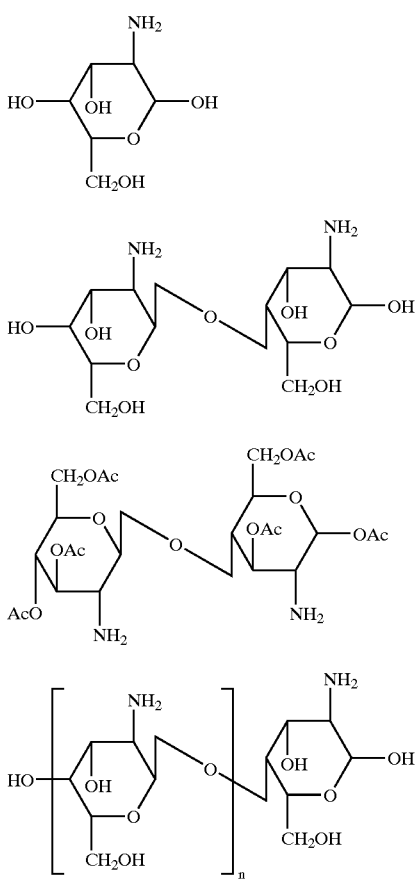

B-4

B-5

B-6

B-7 where n is in the range of 3–25

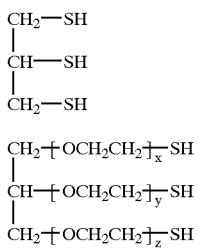

B-8

B-9 where x+y+z is in the range of 1–15

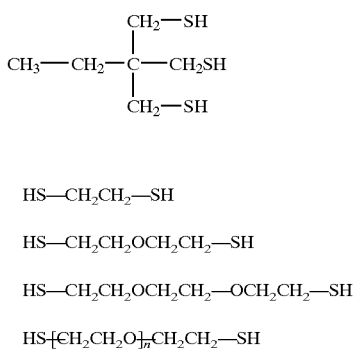

B-10

HS—CH$_2$CH$_2$—SH  B-11

HS—CH$_2$CH$_2$OCH$_2$CH$_2$—SH  B-12

HS—CH$_2$CH$_2$OCH$_2$CH$_2$—OCH$_2$CH$_2$—SH  B-13

HS—[CH$_2$CH$_2$O]$_n$—CH$_2$CH$_2$—SH  B-14 where n is in the range of 3–16

HS—CH$_2$CH$_2$CH$_2$CH$_2$—SH  B-15

HS—CH$_2$CH$_2$CH$_2$CH$_2$CH$_2$—SH  B-16

HS—CH$_2$CH$_2$CH$_2$CH$_2$CH$_2$CH$_2$—SH.  B-17

23. A printing method comprising the steps of (i) providing a set of liquid compositions comprising a first liquid composition containing a first water-soluble compound having in the molecule two or more ethylenically unsaturated double bonds having an electron-attractive substituent on the α-position, and a second liquid composition containing a second water-soluble compound having an active hydrogen atom addable to the first compound in coexistence, at least one of the first liquid composition and the second liquid composition further containing a coloring material; and (ii) applying the first liquid composition and the second liquid composition respectively on a recording medium to cause mixing or contact of the first liquid composition and the second liquid composition.

24. The printing method according to claim 23, wherein, in step (ii), at least one of the first liquid composition and the second liquid composition is applied by an ink-jet system onto a recording medium.

25. The printing method according to claim 23, wherein the first liquid composition is a black ink, and the second liquid composition is a liquid having a color tone not substantially affecting the color tone of a printed article obtained with the first liquid composition.

26. The printing method according to claim 23, wherein the second liquid composition is a black ink, and the first liquid composition is a liquid having a color tone not substantially affecting the color tone of a printed article obtained with the second liquid composition.

27. The printing method according to claim 23, wherein the first liquid composition and the second liquid composition are black inks.

28. The printing method according to claim 23, wherein the first liquid composition is a black ink and the second liquid composition is a color ink.

29. The printing method according to claim 23, wherein the first liquid composition is a color ink and the second liquid composition is a black ink.

30. The printing method according to claim 23, wherein the first liquid composition is a color ink, and the second liquid composition is a liquid having a color tone not substantially affecting the color tone of a printed article obtained with the first liquid composition.

31. The printing method according to claim 23, wherein the second liquid composition is a color ink, and the first liquid composition is a liquid having a color tone not substantially affecting the color tone of a printed article obtained with the second liquid composition.

32. The printing method according to any of claims 28 to 31, wherein the color ink is at least one selected from the group consisting of yellow inks, cyan inks, and magenta inks.

33. The printing method according to claim 23, wherein the first liquid composition and the second liquid composition are respectively a color ink.

34. The printing method according to claim 33, wherein the color of the first liquid composition as the color ink is different from the color of the second liquid composition as the color ink.

35. The printing method according to claim 34, wherein the color inks are at least two color inks having respectively a color selected from the group consisting of yellow, cyan, and magenta.

36. A printing method comprising the steps of (i) providing a set of liquid compositions and an ink comprising a first liquid composition containing a first water-soluble compound having in the molecule two or more ethylenically unsaturated double bonds having an electron-attractive substituent on the α-position, a second liquid composition containing a second water-soluble compound having an active hydrogen atom addable to the first compound in coexistence, and an ink containing a coloring material; (ii) applying the first liquid composition and the second liquid composition respectively on a recording medium to cause mixing or contact of the first liquid composition and the second liquid composition; and (iii) applying the ink onto the recording medium to cause mixing or contact of the ink with at least one of the first liquid composition or the second liquid composition.

37. The printing method according to claim 36, wherein, in step (ii), at least one of the first liquid composition and the second liquid composition is applied by an ink-jet system onto a recording medium.

38. The printing method according to claim 36, wherein, in step (iii), the ink is applied by an ink-jet system onto a recording medium.

39. The printing method according to claim 36, wherein the ink is a black ink.

40. The printing method according to claim 36, wherein the ink is a color ink.

41. The printing method according to claim 36, wherein the ink includes separate plural inks having different color tones.

42. The printing method according to claim 41, wherein the plural inks having different color tones are a black ink and a color ink.

43. The printing method according to claim 41, wherein the plural inks having different color tones are color inks.

44. The printing method according to claim 42 or 43 wherein the color ink is at least one selected from the group consisting of yellow inks, cyan inks, and magenta inks.

45. The printing method according to claim 36, wherein the first liquid composition and the second liquid composition are respectively a liquid having a color tone not substantially affecting the color tone of a printed article obtained with the ink.

46. The printing method according to claim 23 or 36, wherein the second compound has two or more active hydrogen a toms addable to the first compound.

47. The printing method according to claim 46, wherein the second compound has two or more amino groups selected from the group consisting of primary amino groups and secondary amino groups.

48. The printing method according to claim 23 or 36, wherein the first compound is at least one selected from the group consisting of compounds represented by Formulas A-1 to A-12, and the second compound is at least one selected from the group consisting of compounds represented by Formulas B-1 to B-17:

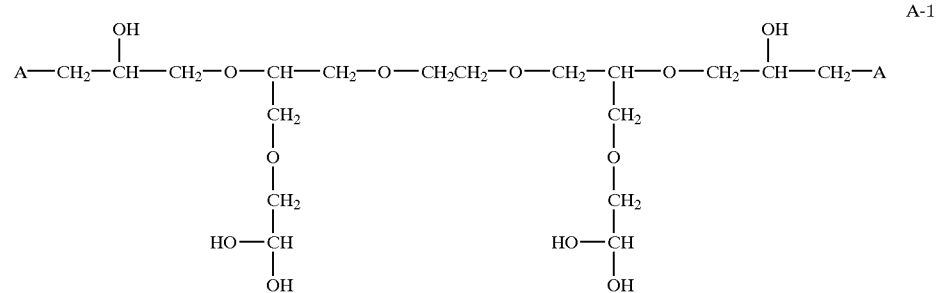

where A is CH=C(X)—C(=O)—O, and X is H or $CH_3$

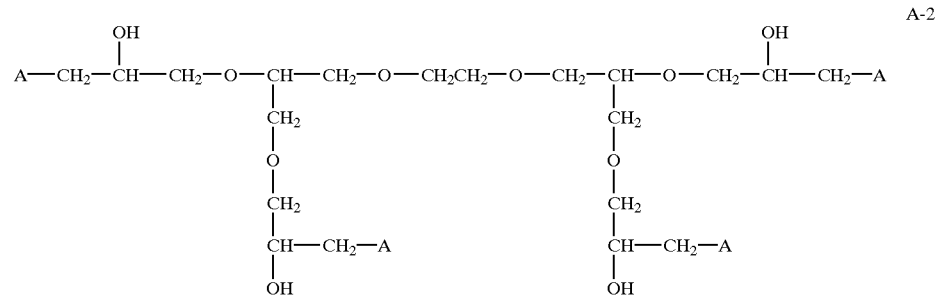

where A is CH=C(X)—C(=O)—O, and X is H or CH₃
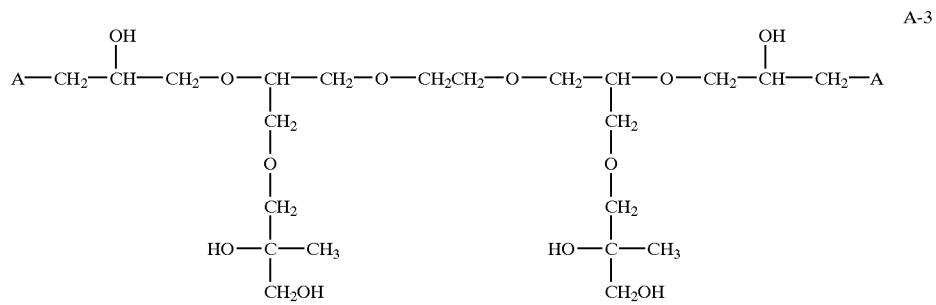
A-3
where A is CH=C(X)—C(=O)—O, and X is H or CH₃
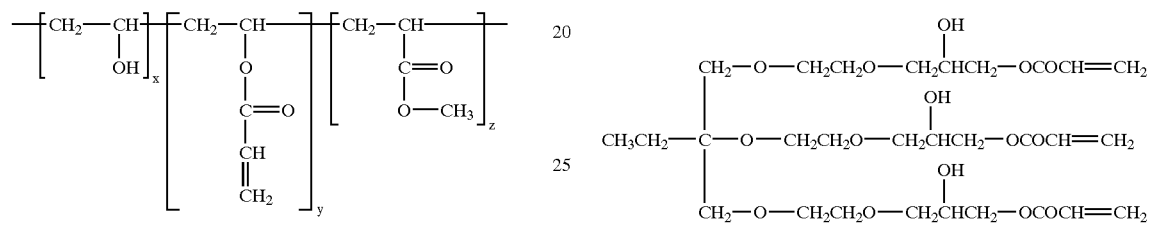
A-4
where x, y and z are respectively an integer in the range of x=10–100, y=3–25, and z=5–25
-continued
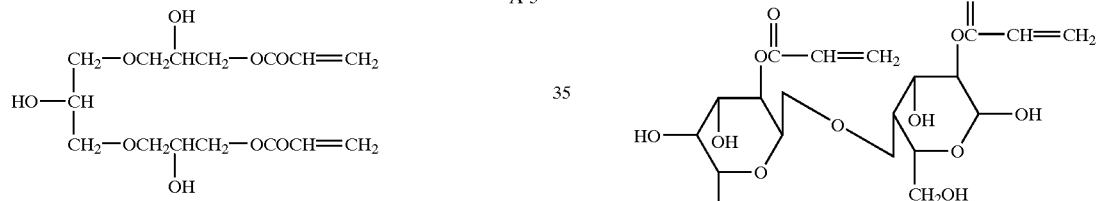
A-5
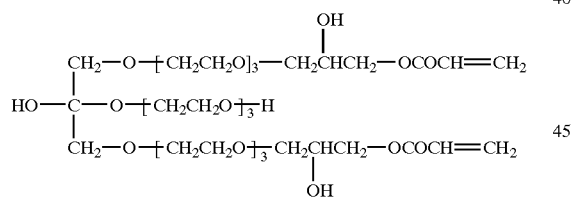
A-6
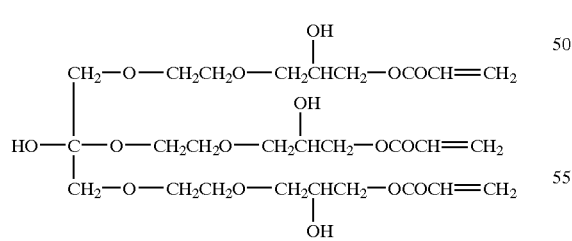
A-7
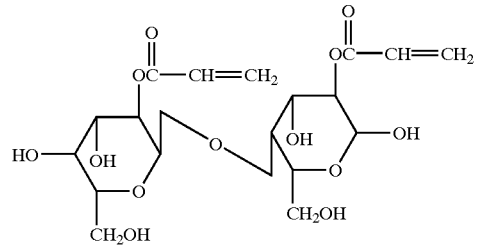
A-8
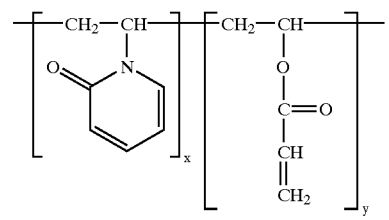
A-9
A-10
where x and y are respectively an integer in the range of x=10–25, y=3–15
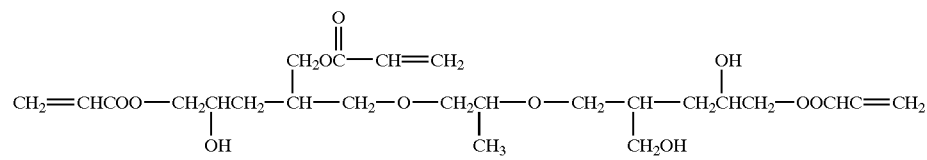
A-11

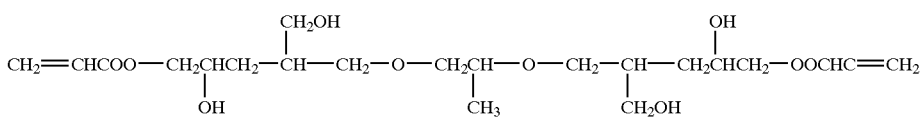
A-12

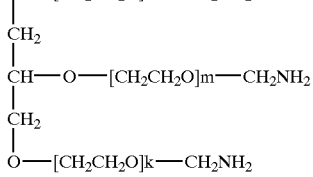
B-1 where n+m+k is in the range of 0–25

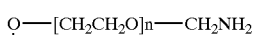
B-2 where n is in the range of 3–25, and $R_1$ is an alkyl of 1–3 carbons

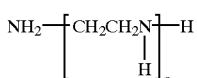
B-3 where n is in the range of 7–1000

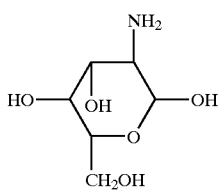
B-4

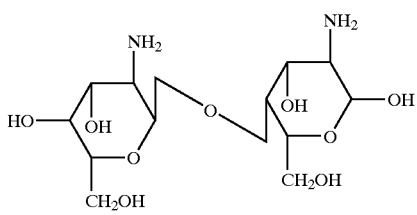
B-5

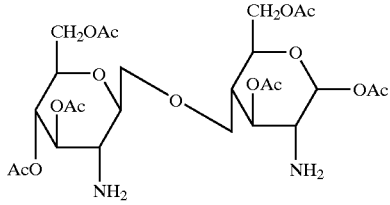
B-6

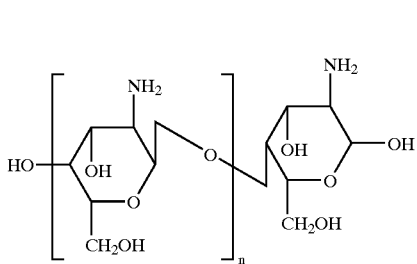
B-7 where n is in the range of 3–25

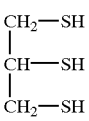
B-8

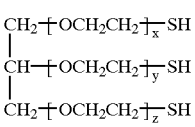
B-9 where x+y+z is in the range of 1–15

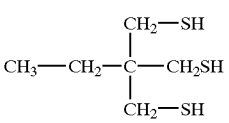
B-10

HS—CH$_2$CH$_2$—SH   B-11

HS—CH$_2$CH$_2$OCH$_2$CH$_2$—SH   B-12

HS—CH$_2$CH$_2$OCH$_2$CH$_2$—OCH$_2$CH$_2$—SH   B-13

HS—[CH$_2$CH$_2$O]$_n$CH$_2$CH$_2$—SH   B-14 where n is in the range of 3–16

HS—CH$_2$CH$_2$CH$_2$CH$_2$—SH   B-15

HS—CH$_2$CH$_2$CH$_2$CH$_2$CH$_2$—SH   B-16

HS—CH$_2$CH$_2$CH$_2$CH$_2$CH$_2$CH$_2$—SH.   B-17

49. An ink, containing, in an aqueous medium, at least one compound selected from the group consisting of compounds represented by Formulas A-1 to A-12, and a coloring material:

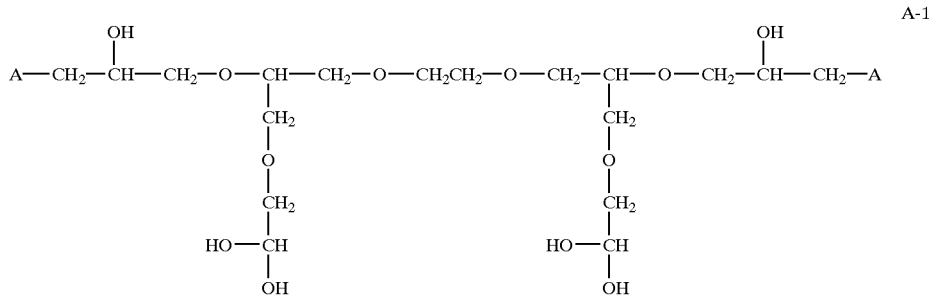
where A is CH=C(X)—C(=O)—O, and X is H or CH$_3$
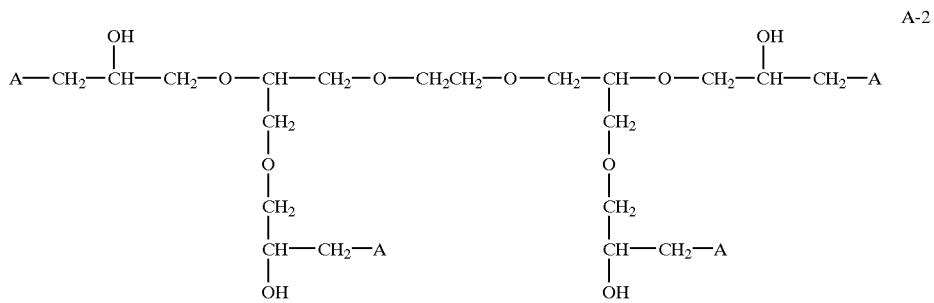
where A is CH=C(X)—C(=O)—O, and X is H or CH$_3$
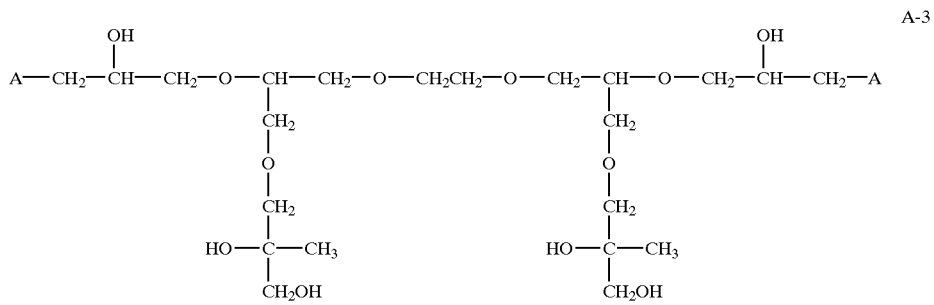
where A is CH=C(X)—C (=O)—O, and X is H or CH$_3$
where x, y and z are respectively an integer in the range of x=10–100, y=3–25, and z=5–25
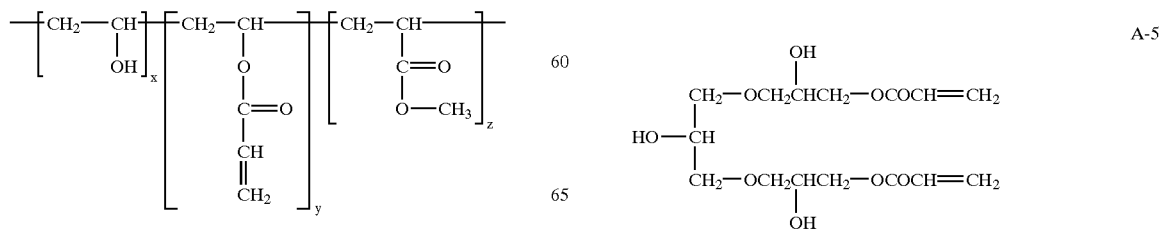

-continued

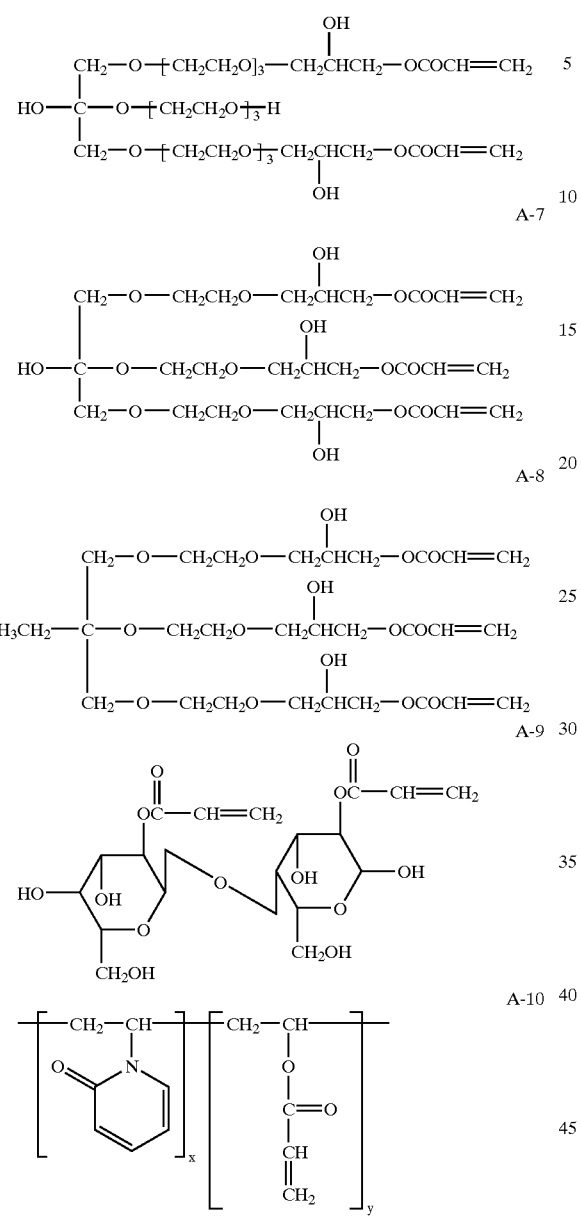

where x and y are respectively an integer in the range of x=10–25, and y=3–15

50. An ink, containing, in an aqueous medium, at least one compound selected from the group consisting of compounds represented by Formulas B-1 to B-3, and a coloring material:

B-1

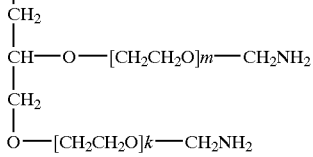

where n+m+k is in the range of 0–25

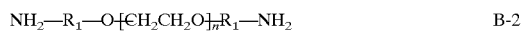

B-2 where n is in the range of 3–25, and $R_1$ is an alkyl of 1–3 carbons

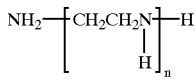

B-3 where n is in the range of 7–1000.

51. A printed article having a colored on containing a coloring material on a recording medium, the colored portion further containing a reaction product of a first liquid composition and a second liquid composition; the first liquid composition containing a first water-soluble compound having in the molecule two or more ethylenically unsaturated double bonds having an electron-attractive substituent on the α-position, and the second liquid composition containing a second water-soluble compound having an active hydrogen atom addable to the first compound in coexistence.

52. The printed article according to claim 51, wherein at least one of the first liquid composition and the second liquid composition contains the coloring material.

53. The printed article according to claim 52, wherein the colored portion is formed by applying at least one of the first liquid composition and the second liquid composition by an ink-jet system onto the recording medium.

54. The printed article according to claim 51, wherein the colored portion is formed by applying at least one of the first liquid composition, the second liquid composition, and an ink by an ink-jet system onto the recording medium.

55. A printing apparatus, comprising a set of liquid compositions comprising a first liquid composition containing a first water-soluble compound having in the molecule two or more ethylenically unsaturated double bonds having

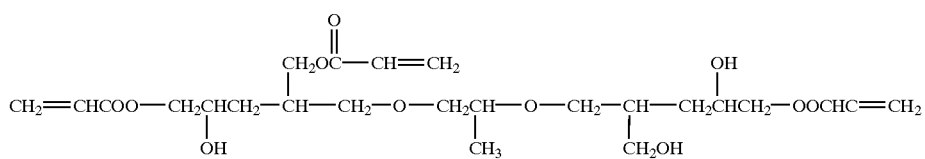

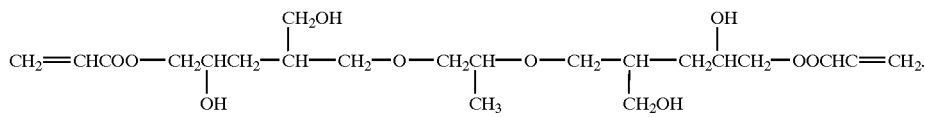

an electron-attractive substituent on the α-position, and a second liquid composition containing a second water-soluble compound having an active hydrogen atom addable to the first compound in coexistence, at least one of the first liquid composition and the second liquid composition further containing a coloring material; an ejecting means for ejecting the first liquid composition and the second liquid composition separately onto a recording medium; and a controlling means to bring the first liquid composition and the second liquid composition into contact together in a liquid state on the recording medium.

56. A printing apparatus comprising a set of liquid compositions and an ink comprising a first liquid composition containing a first water-soluble compound having in the molecule two or more ethylenically unsaturated double bonds having an electron-attractive substituent on the α-position, a second liquid composition containing a second water soluble compound having an active hydrogen atom addable to the first compound in coexistence, and an ink containing a coloring material; an ejecting means for ejecting the first liquid composition, the second liquid composition, and the ink separately onto a recording medium; and a controlling means to bring the first liquid composition, the second liquid composition, and the ink into contact together in a liquid state on the recording medium.

57. A liquid cartridge, comprising a first liquid container holding a first liquid composition containing a first water-soluble compound having in the molecule two or more ethylenically unsaturated double bonds having an electron-attractive substituent on the α-position, and a second liquid container holding a second liquid composition containing a second water-soluble compound having an active hydrogen atom addable to the first compound in coexistence; at least one of the first liquid composition and the second liquid composition further containing a coloring material; the ink cartridge being mountable to and demountable from an ink-jet head for ejecting the first liquid composition and the second liquid composition separately.

58. A liquid cartridge, comprising a first liquid container holding a first liquid composition containing a first water-soluble compound having in the molecule two or more ethylenically unsaturated double bonds having an electron-attractive substituent on the α-position, a second liquid container holding a second liquid composition containing a second water-soluble compound having an active hydrogen atom addable to the first compound in coexistence, and an ink container holding an ink containing a coloring material; the ink cartridge being mountable to and demountable from an ink-jet head for ejecting the first liquid composition, the second liquid composition, and the ink separately.

59. A recording unit, comprising a first liquid container holding a first liquid composition containing a first water-soluble compound having in the molecule two or more ethylenically unsaturated double bonds having an electron-attractive substituent on the α-position, a first ink-jet head for ejecting the first liquid composition held in the first liquid container, a second liquid container holding a second liquid composition containing a second water-soluble compound having an active hydrogen atom addable to the first compound in coexistence, and a second ink-jet head for ejecting the second liquid composition held in the second liquid container; at least one of the first liquid composition and the second liquid composition further containing a coloring material.

60. A recording unit, comprising a first liquid container holding a first liquid composition containing a first water-soluble compound having in the molecule two or more ethylenically unsaturated double bonds having an electron-attractive substituent on the α-position, a first ink-jet head for ejecting the first liquid composition held in the first liquid container, a second liquid container holding a second liquid composition containing a second compound having an active hydrogen atom addable to the first compound in coexistence, a second ink-jet head for ejecting the second liquid composition held in the second liquid container, an ink container holding an ink containing a coloring material, and a third ink-jet head for ejecting the ink held in the ink container.

61. A set of liquid compositions, comprising a first liquid composition containing a first water-soluble compound having in the molecule two or more ethylenically unsaturated double bonds having an electron-attractive substituent on the α-position, and a second liquid composition containing a second water-soluble compound having an active hydrogen atom addable to the first compound in coexistence.

62. The set of liquid compositions according to claim 61, wherein the second compound has two or more active hydrogen atoms addable to the first compound.

63. The set of liquid compositions according to claim 62, wherein the second compound has two or more amino groups selected from the group consisting of primary amino groups and secondary amino groups.

64. The set of liquid compositions according to claim 61, wherein the first compound is at least one selected from the group consisting of compounds represented by Formulas A-1 to A-12, and the second compound is at least one selected from the group consisting of compounds represented by Formulas B-1 to B-17:

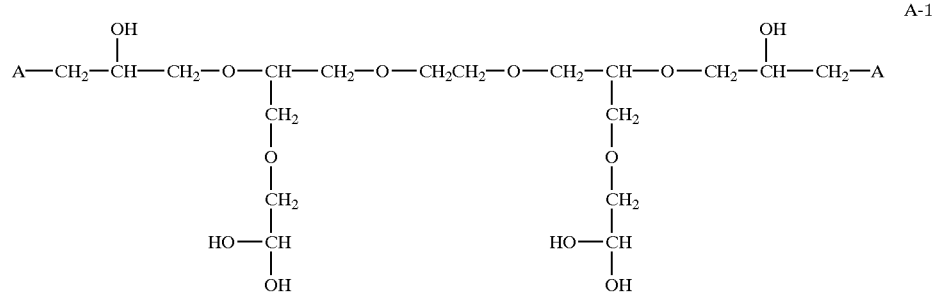

where A is CH=C(X)—C(=O)—O, and X is H or CH$_3$
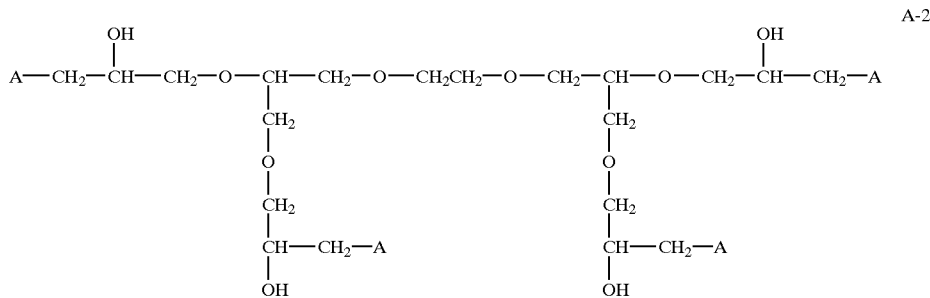
A-2
where A is CH=C(X)—C(=O)—O, and X is H or CH$_3$
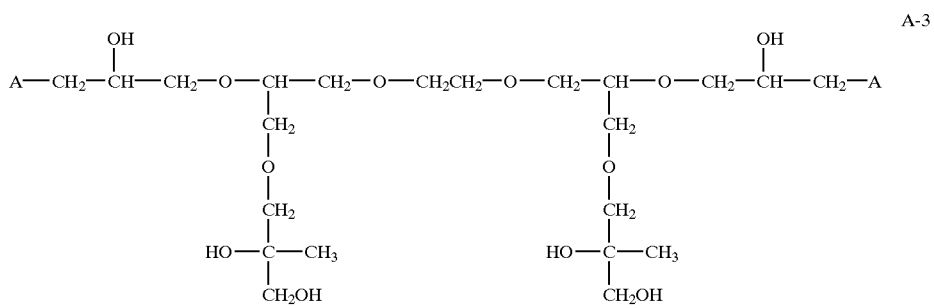
A-3
where A is CH=C(X)—C(=O)—O, and X is H or CH$_3$
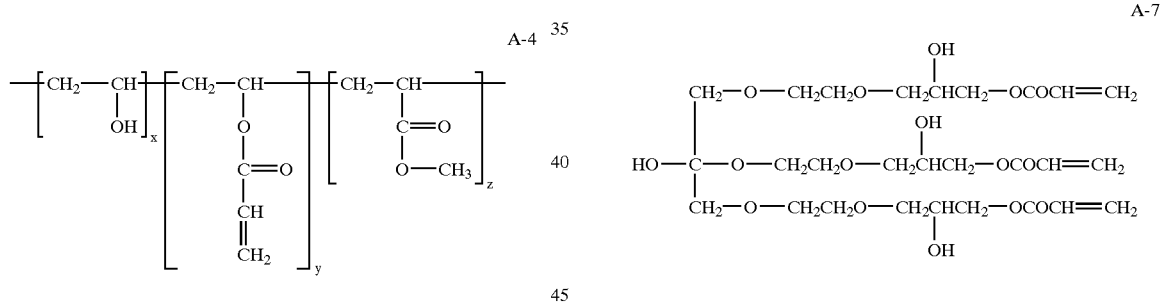
A-4
where x, y and z are respectively an integer in the range of x=10–100, y=3–25, and z=5–25
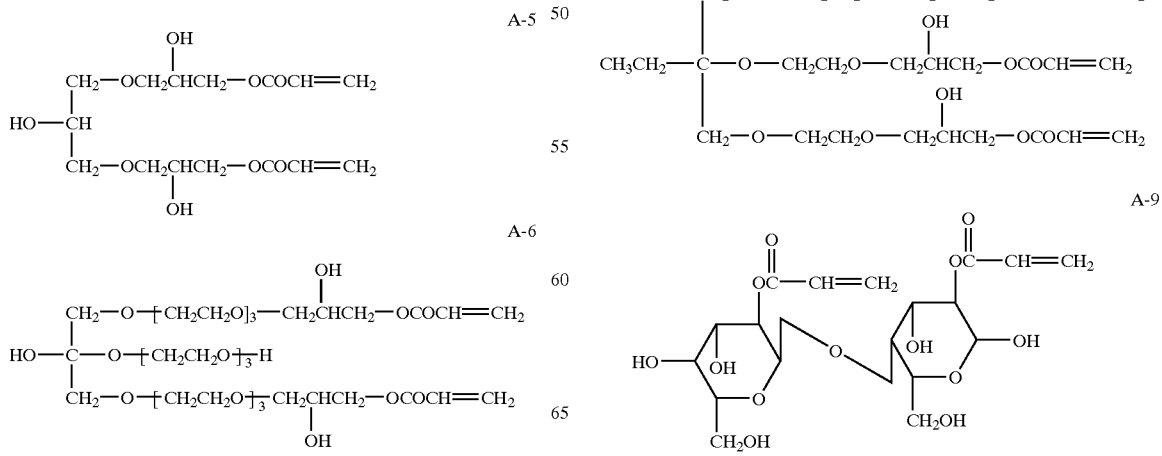
-continued

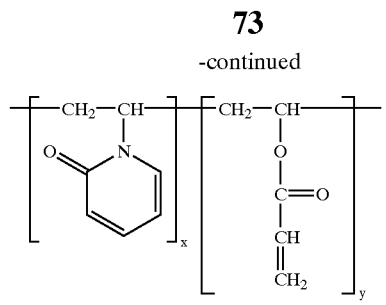
A-10
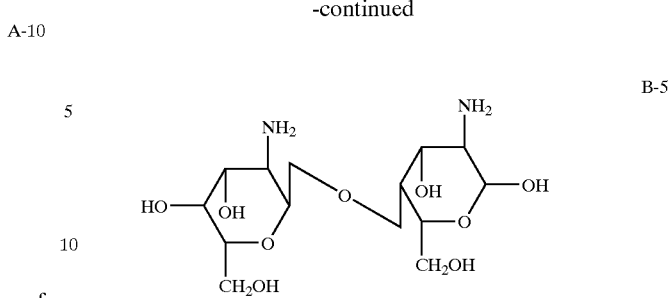
B-5
where x and y are respectively an integer in the range of x=10–25, and y=3–15
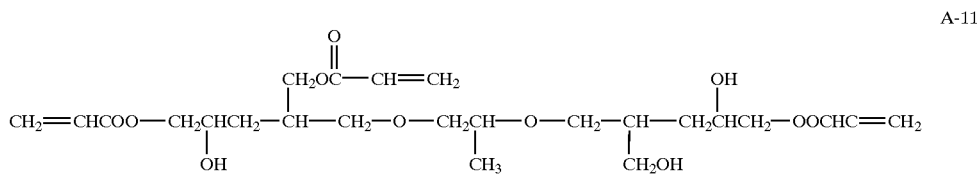
A-11
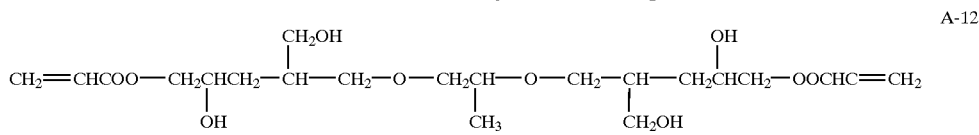
A-12
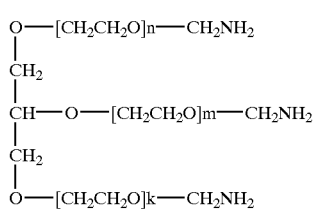
B-1
where n+m+k is in the range of 0–25
-continued
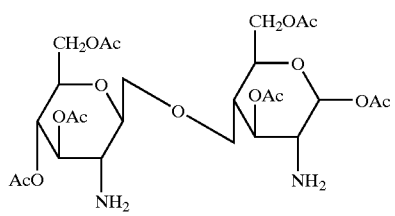
B-6
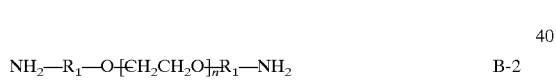
B-2
where n is in the range of 3–25, and $R_1$ is an alkyl of 1–3 carbons
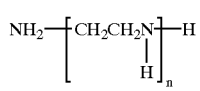
B-3
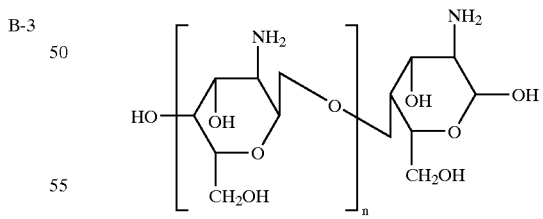
B-7
where n is in the range of 7–1000
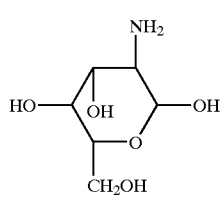
B-4
where n is in the range of 3–25
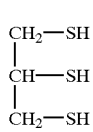
B-8

-continued

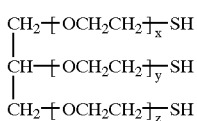
B-9 where x+y+z is in the range of 1–15

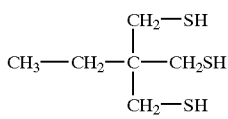
B-10

 B-11
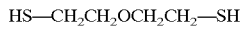 B-12
 B-13
 B-14 where n is in the range of 3–16

 B-15
 B-16
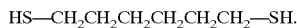 B-17

65. A method of forming a polymeric compound film, comprising the steps of (i) providing a set of liquid compositions comprising a first liquid composition containing a first water-soluble compound having in the molecule two or more ethylenically unsaturated double bonds having an electron-attractive substituent on the α-position, a second liquid composition containing a second water soluble compound having an active hydrogen atom addable to the first compound in coexistence; and (ii) applying the first liquid composition and the second liquid composition respectively on a recording medium to cause mixing or contact of the first liquid composition and the second liquid composition to cause reaction of the first compound and the second compound.

66. The method according to claim 65, wherein, in step (ii), at least one of the first liquid composition and the second liquid composition is applied by an ink-jet system onto a recording medium.

67. The method according to claim 65, wherein the second compound has two or more active hydrogen atoms addable to the first compound.

68. The method according to claim 67, wherein the second compound has two or more amino groups selected from the group consisting of primary amino groups and secondary amino groups.

69. The method according to claim 65, wherein the first compound is at least one selected from the group consisting of compounds represented by Formulas A-1 to A-12, and the second compound is at least one selected from the group consisting of compounds represented by Formulas B-1 to B-17:

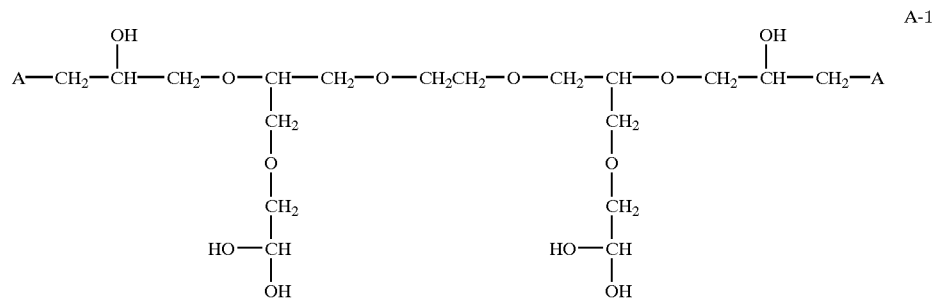

A-1 where A is CH=C(X)—C(=O)—O, and X is H or $CH_3$

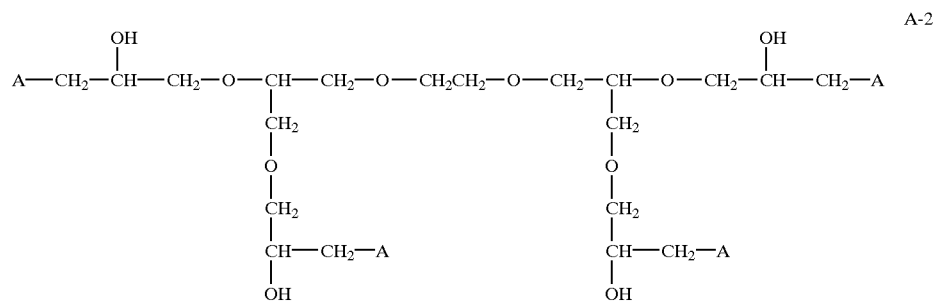

A-2 where A is CH=C(X)—C(=O)—O, and X is H or CH₃
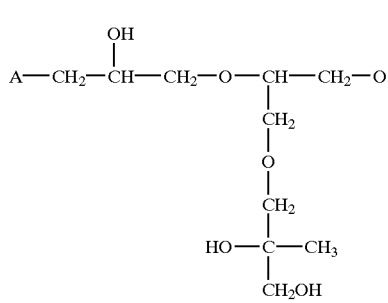
A-3
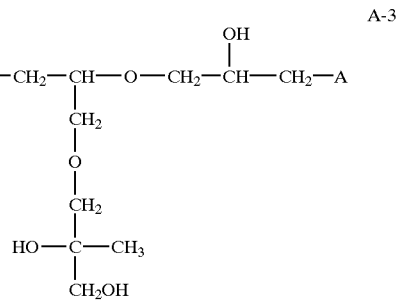
where A is CH=C(X)—C(=O)—O, and X is H or CH₃
A-4
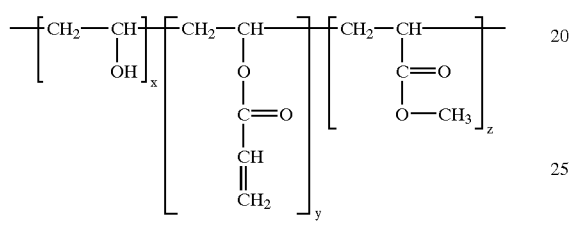
-continued
A-8
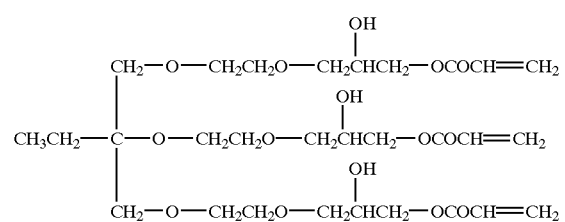
where x, y and z are respectively an integer in the range of x=10–100, y=3–25, and z=5–25
A-5
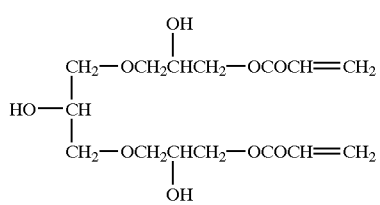
A-9
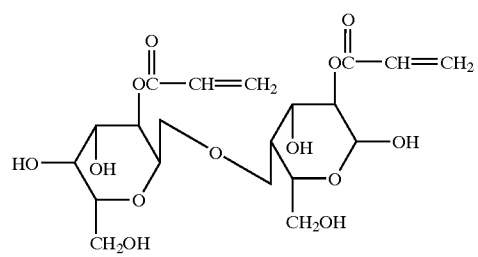
A-6
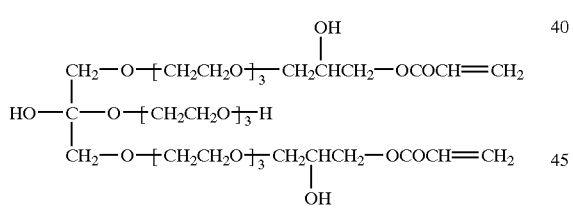
A-10
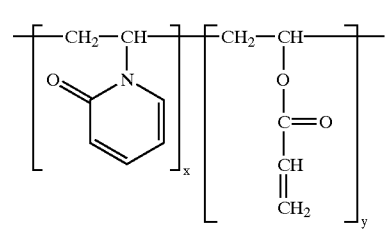
A-7
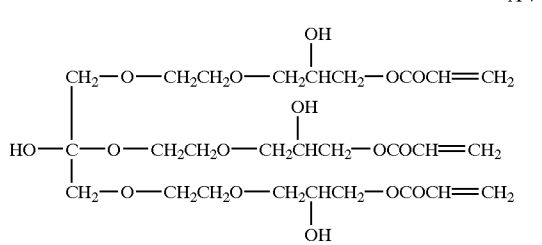
where x and y are respectively an integer in the range of x=10–25, and y=3–15
A-11
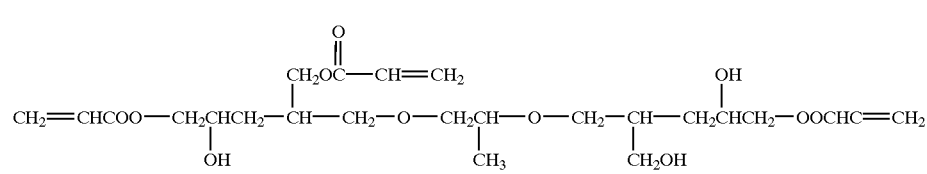

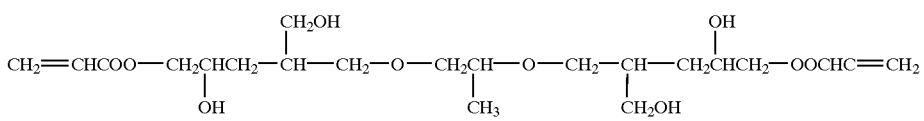
A-12

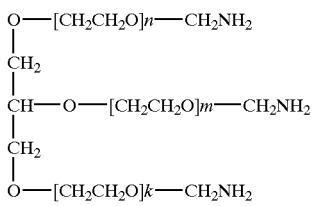
B-1 where n+m+k is in the range of 0–25

$NH_2-R_1-O\!\!-\!\![CH_2CH_2O]_n\!\!-\!\!R_1-NH_2$    B-2 where n is in the range of 3–25, and $R_1$ is an alkyl of 1–3 carbons

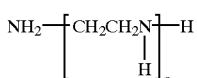    B-3 where n is in the range of 7–1000

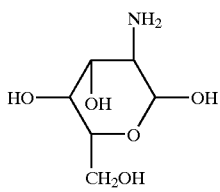    B-4

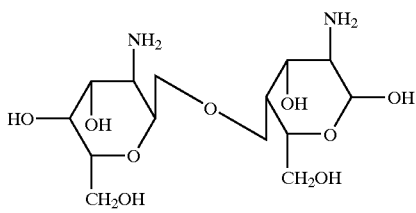    B-5

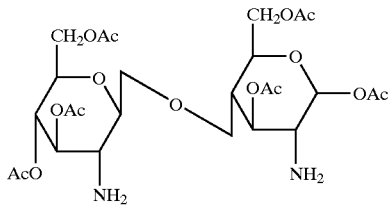    B-6

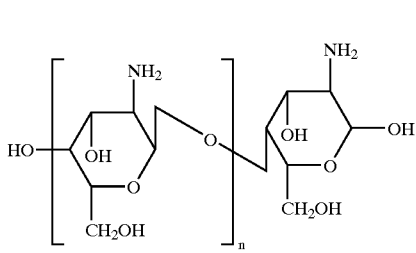    B-7 where n is in the range of 3–25

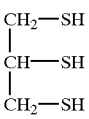    B-8

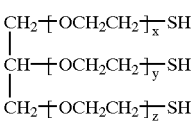    B-9 where x+y+z is in the range of 1–15

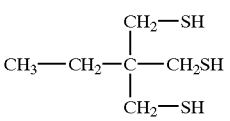    B-10

HS—$CH_2CH_2$—SH    B-11

HS—$CH_2CH_2OCH_2CH_2$—SH    B-12

HS—$CH_2CH_2OCH_2CH_2OCH_2CH_2$—SH    B-13

HS—[$CH_2CH_2O$]$_n$$CH_2CH_2$—SH    B-14 where n is in the range of 3–16

HS—$CH_2CH_2CH_2CH_2$—SH    B-15

HS—$CH_2CH_2CH_2CH_2CH_2$—SH    B-16

HS—$CH_2CH_2CH_2CH_2CH_2CH_2$—SH.    B-17

70. A liquid composition, containing, in an aqueous medium, at least one compound selected from the group consisting of the compounds represented by Formulas A-1 to A-12 below

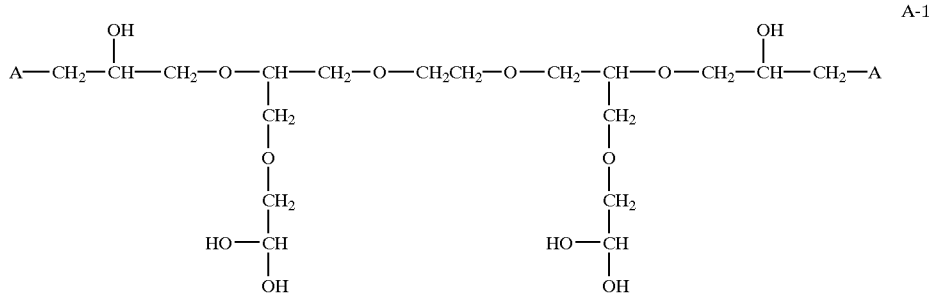
A-1
where A is CH=C(X)—C(=O)—O, and X is H or $CH_3$
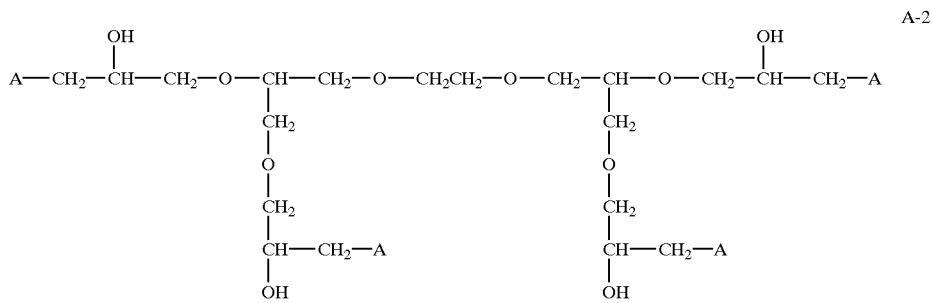
A-2
where A is CH=C(X)—C(=O)—O, and X is H or $CH_3$
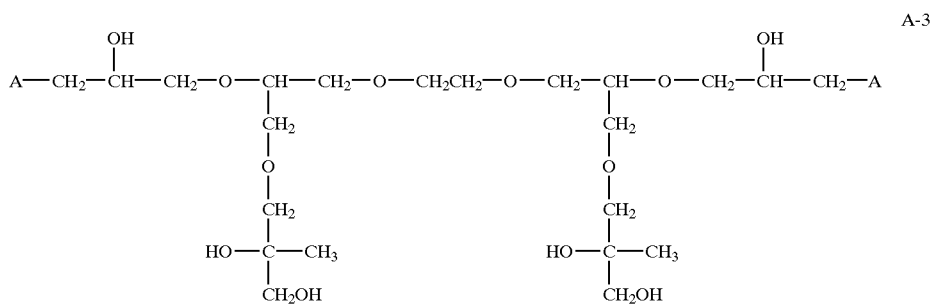
A-3
where A is CH=C(X)—C(=O)—O, and X is H or $CH_3$
where x, y and z are respectively a range of x=10–100, y=3–25, and z=5–25
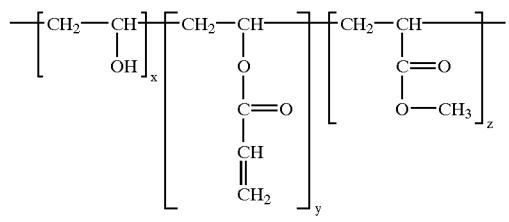
A-4
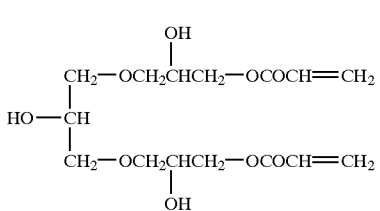
A-5

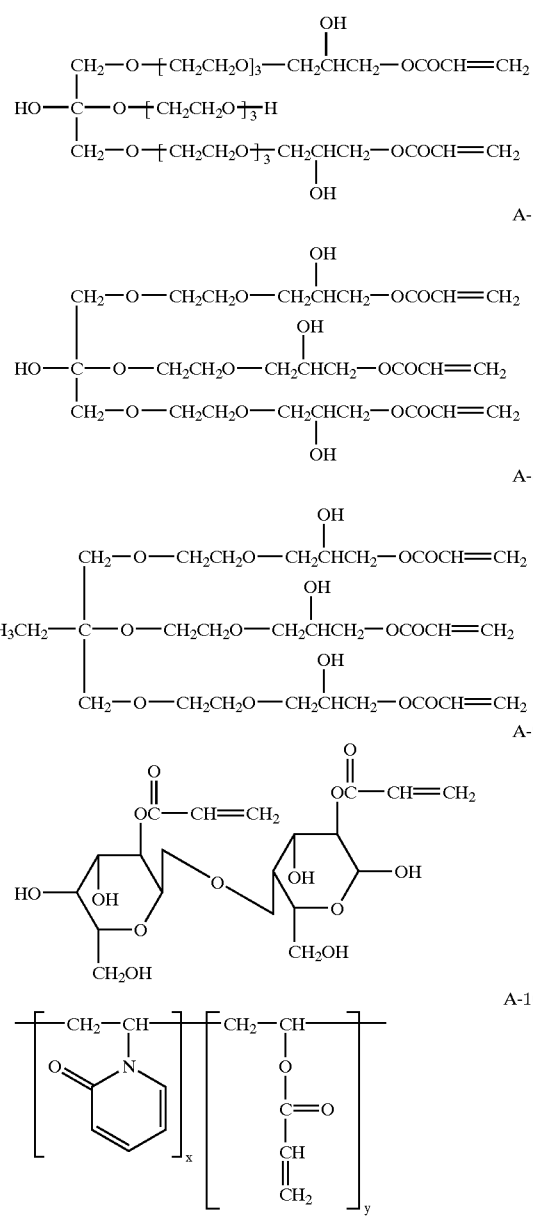

71. A liquid composition, containing, in an aqueous medium, at least one compound selected from the group consisting of the compounds represented by Formulas B-1 to B-3 below:

$$\begin{array}{l}O-[CH_2CH_2O]n-CH_2NH_2\\|\\CH_2\\|\\CH-O-[CH_2CH_2O]m-CH_2NH_2\\|\\CH_2\\|\\O-[CH_2CH_2O]k-CH_2NH_2\end{array}\qquad\text{B-1}$$

where n+m+k is in the range of 0–25

$$NH_2-R_1-O-[CH_2CH_2O]_n-R_1-NH_2 \qquad\text{B-2}$$

where n is in the range of 3–25, and $R_1$ is an alkyl of 1–3 carbons $$NH_2-[CH_2CH_2N(H)]_n-H \qquad\text{B-3}$$

where n is in the range of 7–1000.

72. The liquid composition according to claim 70, being used for forming a polymeric compound film together with another liquid composition containing a water-soluble compound having an active hydrogen atom addable to the compound represented by Formulas A-1 to A-12.

73. The liquid composition according to claim 71, being used for forming a polymeric compound film together with another liquid composition containing a water-soluble compound having in the molecule an ethylenically unsaturated double bond having an electron-attractive substituent on the α-position.

74. The set of liquid compositions according to claim 1, wherein at least one of the first and second liquid compositions is ejected in the form of droplets by applying energy thereto.

75. The set of liquid compositions and an ink according to claim 15, wherein at least one of the first liquid composition, the second liquid composition and the ink is ejected in the form of droplets by applying energy thereto.

76. The ink according to claim 49, being an ink-jet ink.

77. The ink according to claim 50, being an ink-jet ink.

78. The set of liquid compositions according to claim 61, wherein at least one of the first and second liquid compositions is ejected in the form of droplets by applying energy thereto.

79. The liquid composition according to claim 70, being ejected in the form of droplets by applying energy thereto.

80. The liquid composition according to claim 71, being ejected in the form of droplets by applying energy thereto.

* * * * *

UNITED STATES PATENT AND TRADEMARK OFFICE
CERTIFICATE OF CORRECTION

PATENT NO.   : 6,503,307 B1
DATED        : January 7, 2003
INVENTOR(S)  : Hiromichi Noguchi It is certified that error appears in the above-identified patent and that said Letters Patent is hereby corrected as shown below:

Column 5,
Line 7, 

Line 28, "OCOCH-CH$_2$" should read -- OCOCH=CH$_2$ --.

Line 41, "—[CH$_2$CH$_2$O]$_3$—CH$_2$" should read -- —[CH$_2$CH$_2$O]$_3$—CH$_2$- --.

Line 43, "O [CH$_2$CH$_2$O]$_3$ H" should read -- O—[CH$_2$CH$_2$O]$_3$ H- --.

Column 6,
Line 5, 

Line 8, "OCOCH—CH$_2$" should read -- OCOCH=CH$_2$ --.

Column 7,
Line 19, "$_2$HN—R$_1$" should read -- NH$_2$—R$_1$ --.

Line 25, "$_2$HN— —[CH$_2$" should read - -NH$_2$ —[CH$_2$- -.

Column 8,
Line 60, "$_2$HN— · —[CH$_2$" should read - -NH$_2$—[CH$_2$- -.

Line 63, "B-3" should be inserted near the right margin.

Column 9,
Line 8, "atoms" should read -- atom --.

Column 11,
Line 42, "—O CH$_2$—" should read -- —O—CH$_2$— --.

UNITED STATES PATENT AND TRADEMARK OFFICE
CERTIFICATE OF CORRECTION

PATENT NO. : 6,503,307 B1
DATED : January 7, 2003
INVENTOR(S) : Hiromichi Noguchi It is certified that error appears in the above-identified patent and that said Letters Patent is hereby corrected as shown below:

Column 12,
Line 61, "OCOCH—$CH_2$" should read -- OCOCH=$CH_2$ --.

Column 13,
Line 16, "OCOCH—$CH_2$" should read -- OCOCH=$CH_2$ --.
Line 18, "$CH_2CHCH_2$ OCOCH=$CH_2$" should read -- $CH_2CHCH_2$ —OCOCH=$CH_2$ --.
Line 24, "OCOCH-$CH_2$" should read -- OCOCH=$CH_2$ --.
Line 26, "—C O —" should read -- —C—O — --.
Line 63, "—O $CH_2CH$ O $CH_2$—" should read -- —O —$CH_2CH$ —O —$CH_2$— --.

Column 17,
Line 24, "atom" should read -- atoms --.

Column 18,
Line 23, "includes" should read -- includes: --.

Column 19,
Line 15, "HO C—$CH_3$" should read -- HO —C—$CH_3$ --.

Column 20,
Line 27, "$CH_2CH_2O$ $CH_2CHCH_2$" should read -- $CH_2CH_2O$ —$CH_2CHCH_2$ --
Line 30, "OCOCH—- $CH_2$" should read -- OCOCH=$CH_2$ --.
Line 31, "$CH_2CHCH_2$ OCOCH=$CH_2$" should read - -$CH_2CHCH_2$—OCOCH=$CH_2$ --.
Line 42, "$CH_2CH_2O$ $CH_2CHCH_2$" should read -- $CH_2CH_2O$ — $CH_2CHCH_2$ --.

Column 21,
Line 1, "the," should read -- the --.
Line 8, "$CH_2$ —CHCOO" should read -- $CH_2$ =CHCOO --.
Line 66, "compound" should read -- compounds --.

Column 22,
Line 60, "B-17" should read -- B-17 below. --.

Column 24,
Line 45, should be deleted entirely.

UNITED STATES PATENT AND TRADEMARK OFFICE
CERTIFICATE OF CORRECTION

PATENT NO. : 6,503,307 B1
DATED : January 7, 2003
INVENTOR(S) : Hiromichi Noguchi It is certified that error appears in the above-identified patent and that said Letters Patent is hereby corrected as shown below:

Column 25,
Line 38, "group" should read -- groups --.

Column 27,
Line 62, "180," should read -- 180; --.

Column 28,
Lines 55-60, " 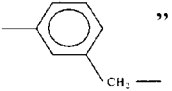 " should read --  --.

Column 29,
Line 18, "NH—L" should read -- NH—L— --.

Lines 40-45, " 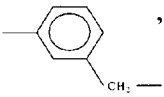 " should read --  --.

Column 31,
Line 67, "is" should read -- are --.

Column 34,
Line 54, "at a" should read -- at --.

Column 36,
Line 45, "in a" should read -- in --.
Line 57, "Marring-pen" should read -- Marking-pen --.

Column 37,
Line 31, "Canon Inc.)" should read -- Canon Inc.). --.
Line 53, "becomes" should read -- become --.

Column 38,
Line 31, "Comparison" should read -- comparison --.
Line 48, "Comparison" should read -- comparison --.

UNITED STATES PATENT AND TRADEMARK OFFICE
CERTIFICATE OF CORRECTION

PATENT NO. : 6,503,307 B1
DATED : January 7, 2003
INVENTOR(S) : Hiromichi Noguchi It is certified that error appears in the above-identified patent and that said Letters Patent is hereby corrected as shown below:

Column 39,
Line 27, "and" should read -- and the --.
Line 50, "Inc.)" should read -- Inc.). --.

Column 40,
Line 51, "head," should read -- heads, --.

Column 43,
Table 11, line 64, "High Colr Carbon," should read -- High Color Carbon, --.

Column 45,
Table 16, line 57, "C.I Direct Blue 85" should read -- C.I. Direct Blue 86 --.

Column 55,
Line 5, "—OCOCH—CH$_2$" should read -- —OCOCH=CH$_2$ --.
Line 63, "HO —C —O—" should read -- CH$_3$CH$_2$ —C —O— --.

Column 60,
Line 9, "42 or 43" should read -- 42 or 43, --.
Line 19, "a toms" should read -- atoms --.

Column 68,
Line 27, "colored on" should read -- colored portion --.

Column 80,
Line 67, "below" should read -- below: --.

Signed and Sealed this

Eighteenth Day of November, 2003

JAMES E. ROGAN
*Director of the United States Patent and Trademark Office*